(12) United States Patent
Yang

(10) Patent No.: US 7,796,407 B2
(45) Date of Patent: *Sep. 14, 2010

(54) METHOD AND APPARATUS OF PROVIDING SYNCHRONOUS REGULATION FOR OFFLINE POWER CONVERTER

(75) Inventor: Ta-Yung Yang, Taoyuan (TW)

(73) Assignee: System General Corp., Taipei Hsien (TW)

(*) Notice: Subject to any disclaimer, the term of this patent is extended or adjusted under 35 U.S.C. 154(b) by 221 days.

This patent is subject to a terminal disclaimer.

(21) Appl. No.: 11/987,597

(22) Filed: Dec. 3, 2007

(65) Prior Publication Data

US 2009/0141521 A1 Jun. 4, 2009

(51) Int. Cl.
*H02M 3/335* (2006.01)
*H02M 7/217* (2006.01)
(52) U.S. Cl. ............................. 363/21.06; 363/127
(58) Field of Classification Search ............... 363/20, 363/21.04, 21.06, 21.07, 21.14, 21.15, 81, 363/84, 127
See application file for complete search history.

(56) References Cited

U.S. PATENT DOCUMENTS

| | | | |
|---|---|---|---|
| 4,855,888 A | 8/1989 | Henze et al. | |
| 5,442,540 A | 8/1995 | Hua et al. | |
| 6,744,649 B1 | 6/2004 | Yang et al. | |
| 7,173,835 B1 | 2/2007 | Yang | |
| 7,224,590 B2* | 5/2007 | Lin | 363/21.06 |
| 7,558,082 B2* | 7/2009 | Jitaru | 363/21.06 |
| 2007/0177410 A1* | 8/2007 | Nakamura et al. | 363/21.06 |
| 2008/0031027 A1* | 2/2008 | Phadke et al. | 363/89 |
| 2008/0266909 A1* | 10/2008 | Tabaian et al. | 363/21.06 |
| 2009/0109711 A1* | 4/2009 | Hsu | 363/21.14 |
| 2009/0213623 A1* | 8/2009 | Yang | 363/49 |

* cited by examiner

*Primary Examiner*—Jessica Han
*Assistant Examiner*—Jeffrey Gblende
(74) *Attorney, Agent, or Firm*—Rosenberg, Klein & Lee

(57) ABSTRACT

A synchronous regulation circuit is provided to improve the efficiency for an offline power converter. A secondary-side switching circuit is coupled to the output of the power converter to generate a synchronous signal and a pulse signal in response to an oscillation signal and a feedback signal. An isolation device transfers the synchronous signal from the secondary side to the primary side of the power converter. A primary-side switching circuit further receives the synchronous signal to generate a switching signal for soft switching a transformer. The pulse signal is utilized to control a synchronous switch for rectifying and regulating the power converter. The synchronous switch includes a power switch and a control circuit. The control circuit receives the pulse signal for turning on/off the power switch. The power switch is connected in between the transformer and the output of the power converter. In addition, a flyback switch is operated as a synchronous rectifier to freewheel the inductor current of the power converter. The flyback switch is turned on in response to the off of the power switch. The on time of flyback switch is correlated to the on time of the power switch.

34 Claims, 18 Drawing Sheets

METHOD AND APPARATUS OF PROVIDING SYNCHRONOUS REGULATION FOR OFFLINE POWER CONVERTER

BACKGROUND OF THE INVENTION

1. Field of Invention

The present invention relates to power converters, and more particularly, to synchronous power converter of power converters.

2. Description of Related Art

An offline power converter includes a power transformer is to provide isolation from AC line input to the output of the power converter for safety. In recent development, using soft switching topologies in the primary side of the transformer and applying the synchronous rectifier in the secondary side of the transformer are to reach a higher efficiency for power conversion. Among them, the full-bridge quasi-resonant ZVS techniques are described in "Constant frequency resonant power converter with zero voltage switching" by Christopher, P. Henze, et al, U.S. Pat. No. 4,855,888; "Soft-switching PWM converters" by Guichao C. Hua and Fred C. Lee, U.S. Pat. No. 5,442,540; "Zero switching power converter operable as asymmetrical full-bridge converter" by Yang, et al, U.S. Pat. No. 6,744,649. The drawback of foregoing power converters is low efficiency at light load. An insufficient circular power causes hard switching and results low efficiency. The purpose of using the synchronous rectifier at the secondary side of the transformer is to reduce the power loss of rectifiers. The description of the synchronous rectifying can be found in a prior art of "Control circuit associated with saturable inductor operated as synchronous rectifier forward power converter" by Yang, U.S. Pat. No. 7,173,835. The disadvantage of this skill is extra devices such as saturable inductors and current-sense resistor cause additional power consumptions. The object of present invention is to integrate the synchronous rectifying circuit with the regulation circuit to achieve higher efficiency. No further switching stage is needed. The primary-side switching circuit, the secondary-side synchronous rectifier and the regulation circuit achieve high efficiency power conversion from no load to full load.

SUMMARY OF THE INVENTION

A synchronous regulation circuit is developed to improve the efficiency of offline power converter. It includes a primary-side switching circuit, a secondary-side switching circuit, a synchronous switch and a flyback switch. The secondary-side switching circuit is coupled to the output of the power converter to generate a pulse signal and a synchronous signal in response to an oscillation signal and a feedback signal. The feedback signal is correlated to the output of the power converter. The synchronous signal is coupled from the secondary side of the power converter to the primary side of the power converter through an isolation device. The primary-side switching circuit generates a switching signal in response to the synchronous signal. The switching signal is coupled to switch a transformer. The pulse signal is generated for the rectifying and the regulating of the power converter. The synchronous switch includes a power switch and a control circuit. The power switch is connected in between the secondary side of the transformer and the output of the power converter. The control circuit receives the pulse signal for turning on/off the power switch. The pulse signal is coupled from the secondary-side switching circuit to the control circuit through capacitors. The polarity of the pulse signal determines the on/off the power switch. The flyback switch is connected to the power switch and the output of the power converter. The flyback switch is turned on in response to the off of the power switch. The on time of flyback switch is programmable and is correlated to the on time of the power switch.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 is a preferred embodiment of an offline power converter having a synchronous regulation circuit according to the present invention;

DETAILED DESCRIPTION OF PREFERRED EMBODIMENTS

Figure 1:
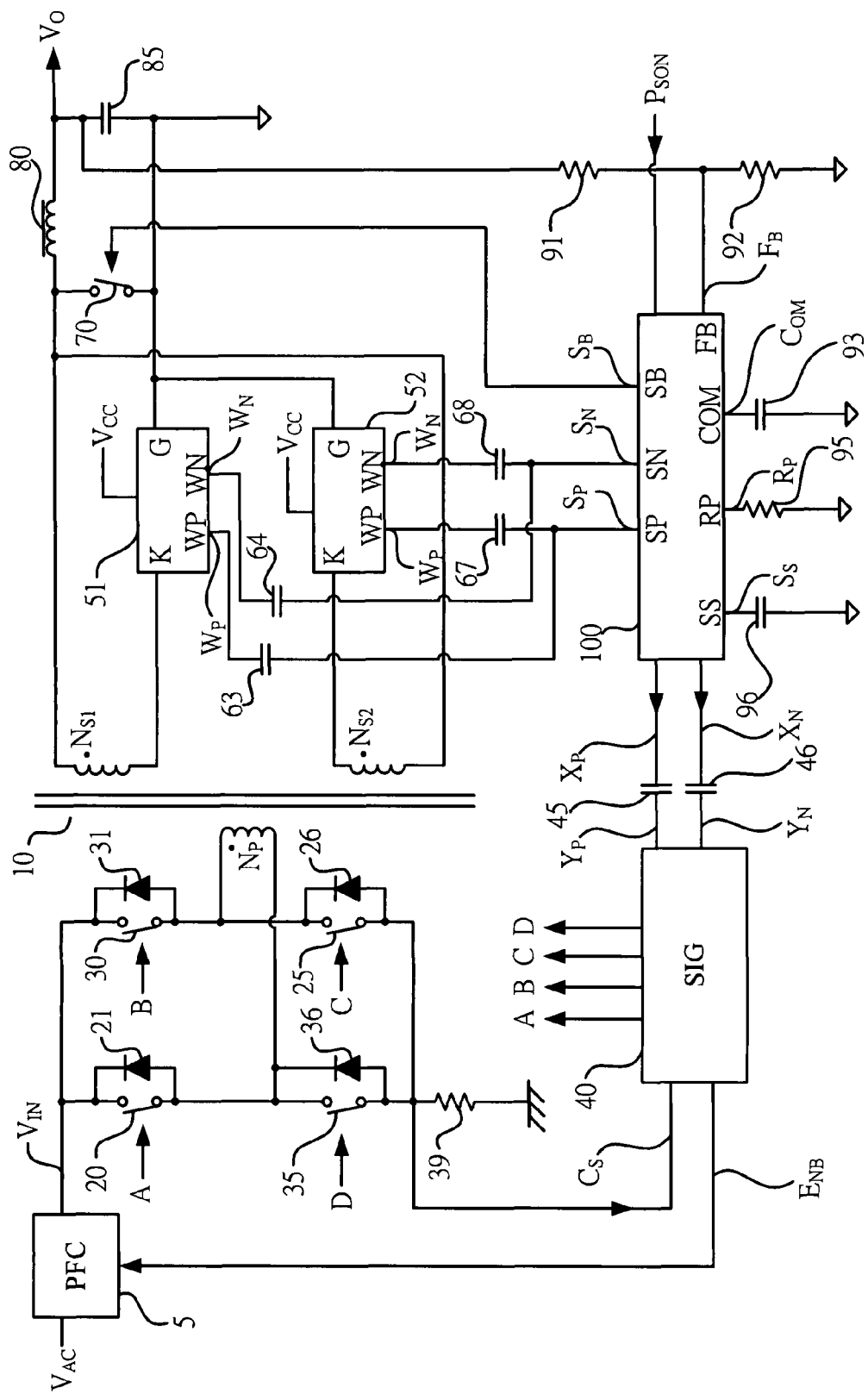

FIG. 1 shows a preferred offline power converter with synchronous regulation circuit. The power converter includes a transformer 10 having a primary side and a secondary side. At the primary side, a primary winding $N_P$ of the transformer 10 is connected to four switching-transistors 20, 25 and 30, 35 for switching the transformer 10. The switching-transistors 20, 30 are coupled to an input voltage $V_{IN}$. The switching-transistors 25, 35 are coupled to the ground. A primary-side switching circuit 40 (SIG) generates switching signals A, B, C, D in response to synchronous signals $Y_P/Y_N$. Switching signals A, B, C, D are coupled to switch the primary winding $N_P$ of the transformer 10. The primary-side switching circuit 40 further generates an enable signal $E_{NB}$ to control the on/off of a PFC circuit 5 (PFC) of the power converter. The enable signal $E_{NB}$ shows the output load condition of the power converter. The PFC circuit 5 is generally used for power factor correction of the power converter. The PFC circuit 5 is coupled to receive a line voltage $V_{AC}$ to provide the input voltage $V_{IN}$. Furthermore, a current-sense device 39 generates a current-sense signal $C_S$ in response to the switching current of the transformer 10. The current-sense signal $C_S$ is coupled to the primary-side switching circuit 40 to disable the switching signals A, B once the current-sense signal $C_S$ is over an over-current threshold $V_{CS}$ (shown in FIG. 9).

The secondary side of the transformer 10 includes a first secondary winding $N_{S1}$ and a second secondary winding $N_{S2}$. Switching voltages are produced across the secondary windings $N_{S1}$ and $N_{S2}$ in response to the switching of the transformer 10. A first synchronous switch 51 has a terminal K connected to the first secondary winding $N_{S1}$. A terminal G of the first synchronous switch 51 is connected to the ground of the output terminal of the power converter. A power source $V_{CC}$ is coupled to the first synchronous switch 51. A terminal K of a second synchronous switch 52 is connected to the second secondary winding $N_{S2}$. A terminal G of the second synchronous switch 52 is also connected to the ground of the output terminal of the power converter. The power source $V_{CC}$ is also coupled to the second synchronous switch 52. The synchronous switches 51 and 52 include a power switch and a control circuit respectively. The power switch is coupled in between the terminal K and the terminal G. The control circuit receives pulse signals $S_{PN}/W_{PN}$ ($S_P/S_N$ and $W_P/W_N$) for turning on/off the power switch.

The first synchronous switch 51 is coupled to terminals SP and SN of a secondary-side switching circuit 100 through capacitors 63 and 64 to receive the pulse signals $S_P/S_N$ and generate the pulse signals $W_P/W_N$ at terminals WP and WN of the first synchronous switch 51. The second synchronous switch 52 is also connected to the terminals SP and SN of the secondary-side switching circuit 100 through capacitors 67 and 68. The secondary-side switching circuit 100 is coupled to the output terminal of the power converter to generate synchronous signals $X_P/X_N$ and the pulse signals $S_P/S_N$ in response to oscillation signals $P_{S1}$, $P_{S2}$, $P_{S3}$ (shown in FIG. 2) and a feedback signal $F_B$ from a feedback terminal FB. Oscillation signals $P_{S1}$, $P_{S2}$, $P_{S3}$ are generated inside the secondary-side switching circuit 100. The feedback signal $F_B$ is coupled to the output terminal of the power converter via resistors 91 and 92. The feedback signal $F_B$ is thus correlated to the output voltage $V_O$ of the power converter. An output capacitor 85 is coupled between the output terminal of the power converter and the ground. Synchronous signals $Y_P/Y_N$ are generated via isolation devices, such as capacitors 45, 46. Capacitors 45 and 46 are coupled to the secondary-side switching circuit 100 for transferring the synchronous signals $X_P/X_N$. Pulse signals $S_P/S_N$ are generated for rectifying and regulating of the power converter. The polarity of the pulse signals $S_P/S_N$ determines the on/off of the power switches.

An inductor 80 is coupled from the first secondary winding $N_{S1}$ and the second secondary winding $N_{S2}$ to the output $V_O$ of the power converter. A flyback switch 70 is coupled to the synchronous switches 51 and 52 through the secondary windings $N_{S1}$ and $N_{S2}$ respectively. The flyback switch 70 is further connected to the ground of the output terminal of the power converter to freewheel the switching current of the inductor 80. The secondary-side switching circuit 100 generates a drive signal $S_B$ from a terminal SB to control the flyback switch 70. The flyback switch 70 is turned on in response to the off of the power switch. The on time of the flyback switch 70 is programmable and correlated to the on time of the power switch. Furthermore, the synchronous signals $X_P/X_N$ and the pulse signals $S_P/S_N$ are generated in response to a power-on signal $P_{SON}$. The power-on signal $P_{SON}$ is utilized to control the on/off of the power converter. The enable signal $E_{NB}$ is also generated in response to the power-on signal $P_{SON}$. A capacitor 93 is connected to an output terminal COM of the secondary-side switching circuit 100 for the loop compensation. A capacitor 96 is coupled to a terminal SS of the secondary-side switching circuit 100 and used for the soft start. A resistor 95 is coupled to a terminal RP of the secondary-side switching circuit 100 and applied to program the on time of the flyback switch 70.

Figure 2:
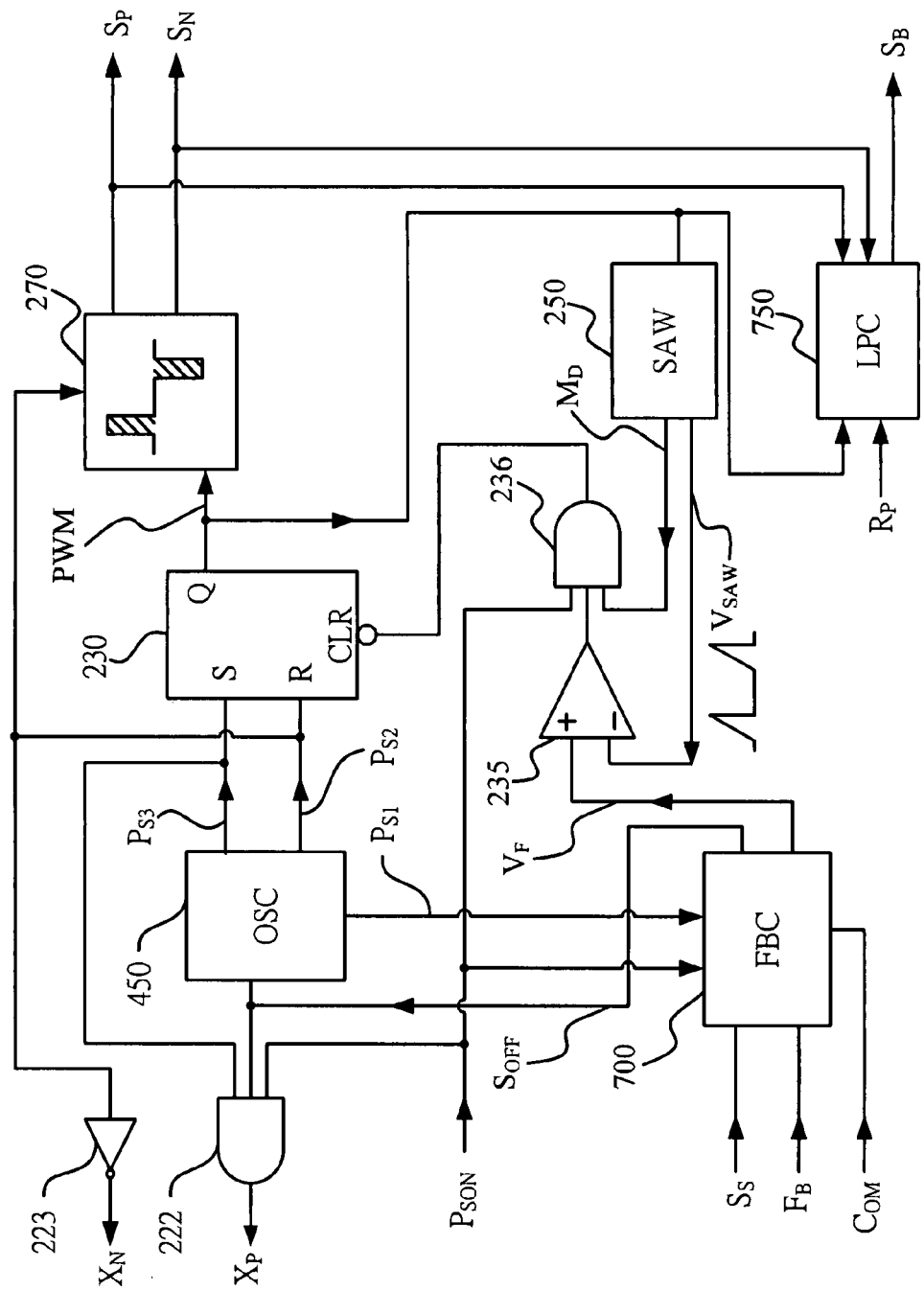
FIG. 2 is a preferred embodiment of a secondary-side switching circuit according to the present invention.

FIG. 2 is the circuit schematic of the secondary-side switching circuit 100. An oscillation circuit 450 (OSC) generates oscillation signals $P_{S1}$, $P_{S2}$ and $P_{S3}$. Oscillation signals $P_{S2}$ and $P_{S3}$ are coupled to the input terminals R and S of a SR-flip-flop 230. The SR-flip-flop 230, an AND gate 236 and a comparator 235 develop a PWM circuit for generating a PWM signal at the output terminal Q of the SR-flip-flop 230 in response to the oscillation signals $P_{S2}$ and $P_{S3}$. The clear-input terminal CLR of the SR-flip-flop 230 is controlled by the output of the AND gate 236. The input of the AND gate 236 is controlled by the comparator 235. A feedback circuit 700 (FBC) includes an error amplifier, a soft-start circuit, a protection circuit and a power management circuit. The feedback circuit 700 generates an off-control signal $S_{OFF}$ during the light load of the power converter for power saving. Furthermore, the off-control signal $S_{OFF}$ will be generated when the feedback of the power converter is open loop. The off-control signal $S_{OFF}$ is coupled to disable the switching signals A, B and turn off the power switches of the synchronous switches 51, 52. The error amplifier and the soft-start circuit of the feedback circuit 700 generate an error signal $V_F$ in response to the feedback signal $F_B$ and a soft-start signal $S_S$. A ramp circuit 250 (SAW) is designed to produce a ramp signal $V_{SAW}$ and a maximum-duty signal $M_D$ in response to the PWM signal. The error signal $V_F$ and the ramp signal $V_{SAW}$ are connected to the input terminals of the comparator 235. The output terminal of the comparator 235, the power-on signal $P_{SON}$ and the maximum-duty signal $M_D$ are connected to the input terminals of the AND gate 236 to generate a clear signal for disabling the PWM signal.

A pulse signal generator 270 is used to generate the pulse signals $S_P/S_N$ in accordance with the PWM signal and the oscillation signal $P_{S2}$. Therefore, the PWM signal is enabled in response to the oscillation signal $P_{S3}$. The PWM signal is disabled in response to the oscillation signal $P_{S2}$ and the clear signal. The soft-start signal $S_S$ is coupled to control the pulse width of the PWM signal. Pulse signals $S_P/S_N$ are a differential signal. The polarity of pulse signals $S_P/S_N$ is determined by the PWM signal. Synchronous signals $X_P/X_N$ are also a differential signal. The polarity of the synchronous signals $X_P/X_N$ controls switching signals A, B, C, and D. An AND gate 222 and a buffer 223 generate the synchronous signals $X_P/X_N$. The synchronous signal $X_P$ is generated at the output terminal of the AND gate 222. The synchronous signal $X_N$ is outputted by the output terminal of the buffer 223. The input of the buffer 223 is the oscillation signal $P_{S2}$. The oscillation signal $P_{S3}$, the power-on signal $P_{SON}$ and the off-control signal $S_{OFF}$ are connected to the input terminals of the AND gate 222. Therefore the switching signals A, B, C, D are controlled by the off-control signal $S_{OFF}$ and the power-on signal $P_{SON}$. The switching-transistors 20, 25, 30, 35 (shown in FIG. 1) and the power switches of the synchronous switches 51, 52 are turned off once the power-on signal $P_{SON}$ is disabled.

Furthermore, a linear-predict circuit 750 (LPC) is used for generating the drive signal $S_B$. The drive signal $S_B$ is coupled to control the flyback switch 70 (shown in FIG. 1) in response to a program signal $R_P$, the PWM signal and the pulse signals $S_P/S_N$. A programming device, such as the resistor 95 (shown in FIG. 1) is applied to generate the program signal $R_P$.

Figure 3:
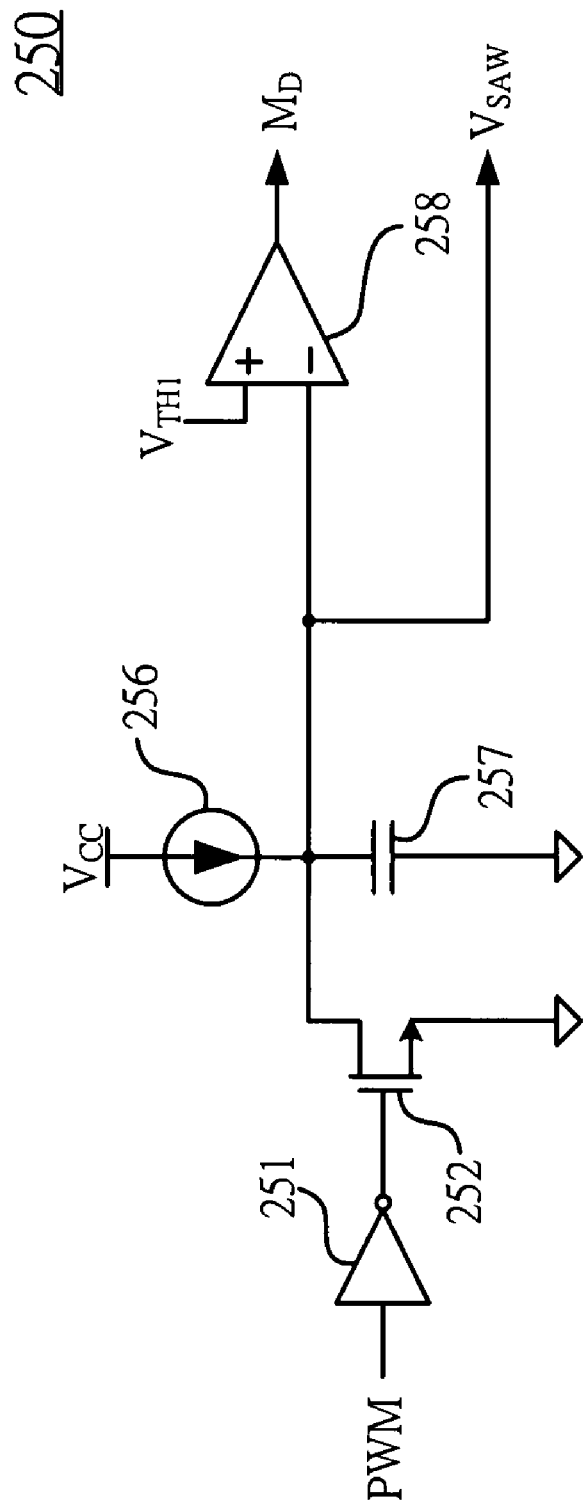
FIG. 3 is a preferred embodiment of a ramp circuit according to the present invention.

FIG. 3 is the circuit schematic of the ramp circuit 250. A current source 256 coupled to the power source $V_{CC}$ is utilized to charge a capacitor 257 in response to the enable of the PWM signal. The PWM signal is connected to discharge the capacitor 257 through an inverter 251 and a transistor 252 when the PWM signal is disabled. The ramp signal $V_{SAW}$ is thus generated at the capacitor 257. A threshold voltage $V_{TH1}$ is connected to the input terminal of a comparator 258. Another input terminal of the comparator 258 is connected to the ramp signal $V_{SAW}$. The output terminal of the comparator 258 will generate the maximum-duty signal $M_D$ to disable the PWM signal once the ramp signal $V_{SAW}$ is higher than the threshold voltage $V_{TH1}$. Therefore, the maximum on time of the PWM signal is limited.

Figure 4:
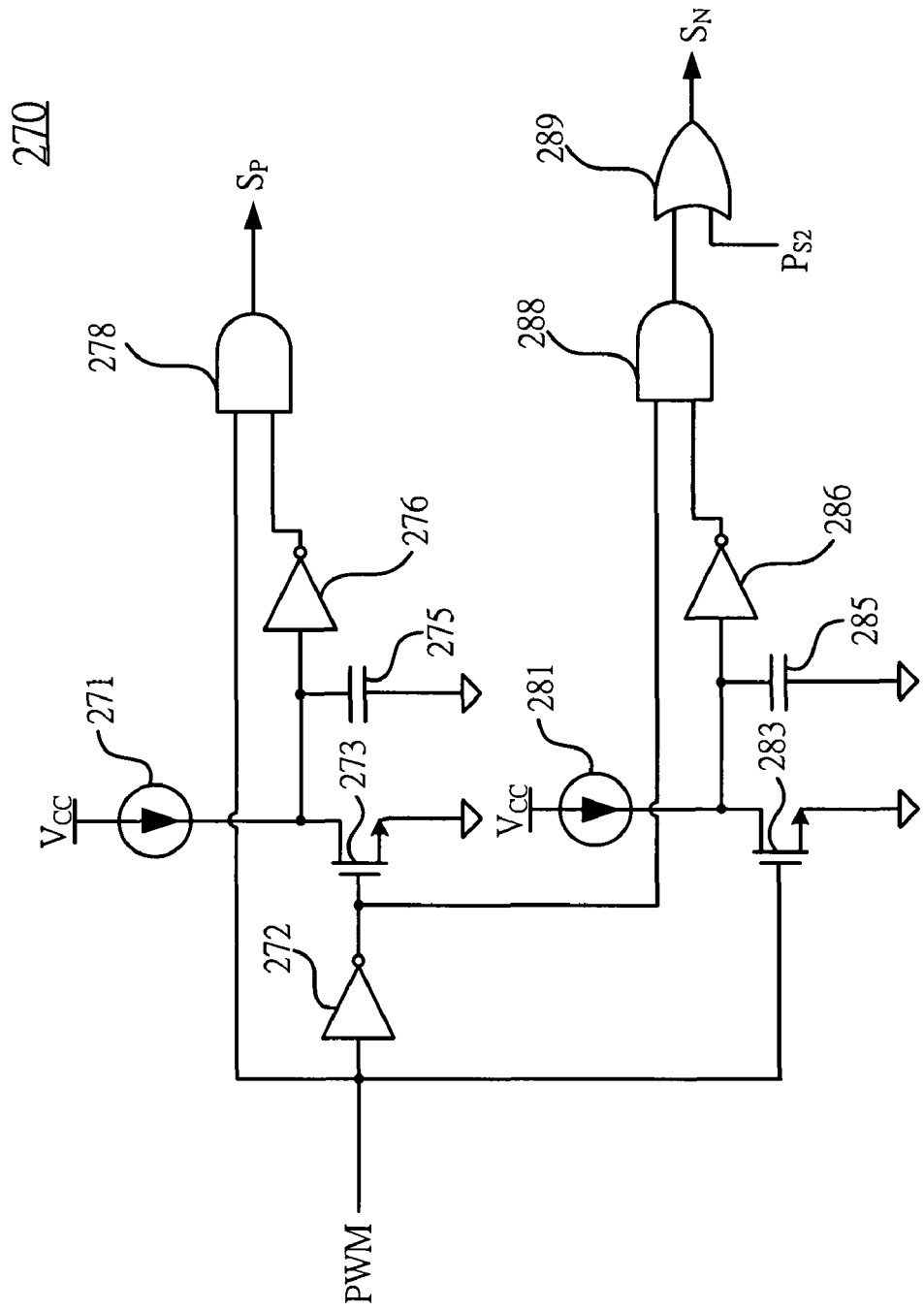
FIG. 4 is a preferred embodiment of a pulse signal generator according to the present invention.

FIG. 4 shows the circuit of the pulse signal generator 270. The pulse signals $S_P/S_N$ is the differential signal. A positive-polarity pulse signal $S_P/S_N$ is generated in response to the rising edge of the PWM signal. A negative-polarity pulse signal $S_P/S_N$ is generated in response to the falling edge of the PWM signal and the oscillation signal $P_{S2}$ Therefore, the pulse signals $S_P/S_N$ are one-shot signal. The pulse width of the pulse signals $S_P/S_N$ is shorter than the pulse width of the switching signals A, B, C, D. A current source 271 coupled to the power source $V_{CC}$ is connected to charge a capacitor 275. The PWM signal is coupled to discharge the capacitor 275 via an inverter 272 and a transistor 273 when the PWM is disabled. The capacitor 275 is connected to the input terminal of an inverter 276. The input terminals of an AND gate 278 are connected to the output terminal of the inverter 276 and the PWM signal.

A current source 281 coupled to the power source $V_{CC}$ is connected to charge a capacitor 285. The PWM signal is coupled to discharge the capacitor 285 through a transistor 283 when the PWM is enabled. The capacitor 285 is connected to the input terminal of an inverter 286. The input terminals of an AND gate 288 are connected to the output terminal of the inverter 286 and the output terminal of the inverter 272. The output terminal of the AND gate 288 and the oscillation signal $P_{S2}$ is connected to the input terminals of an OR gate 289. The output terminal of the AND gate 278 and the output terminal of the OR gate 289 generate the pulse signals $S_P/S_N$. The pulse width of pulse signals $S_P/S_N$ is determined by the current of current sources 271, 281 and the capacitance of capacitors 275, 285.

Figure 5:
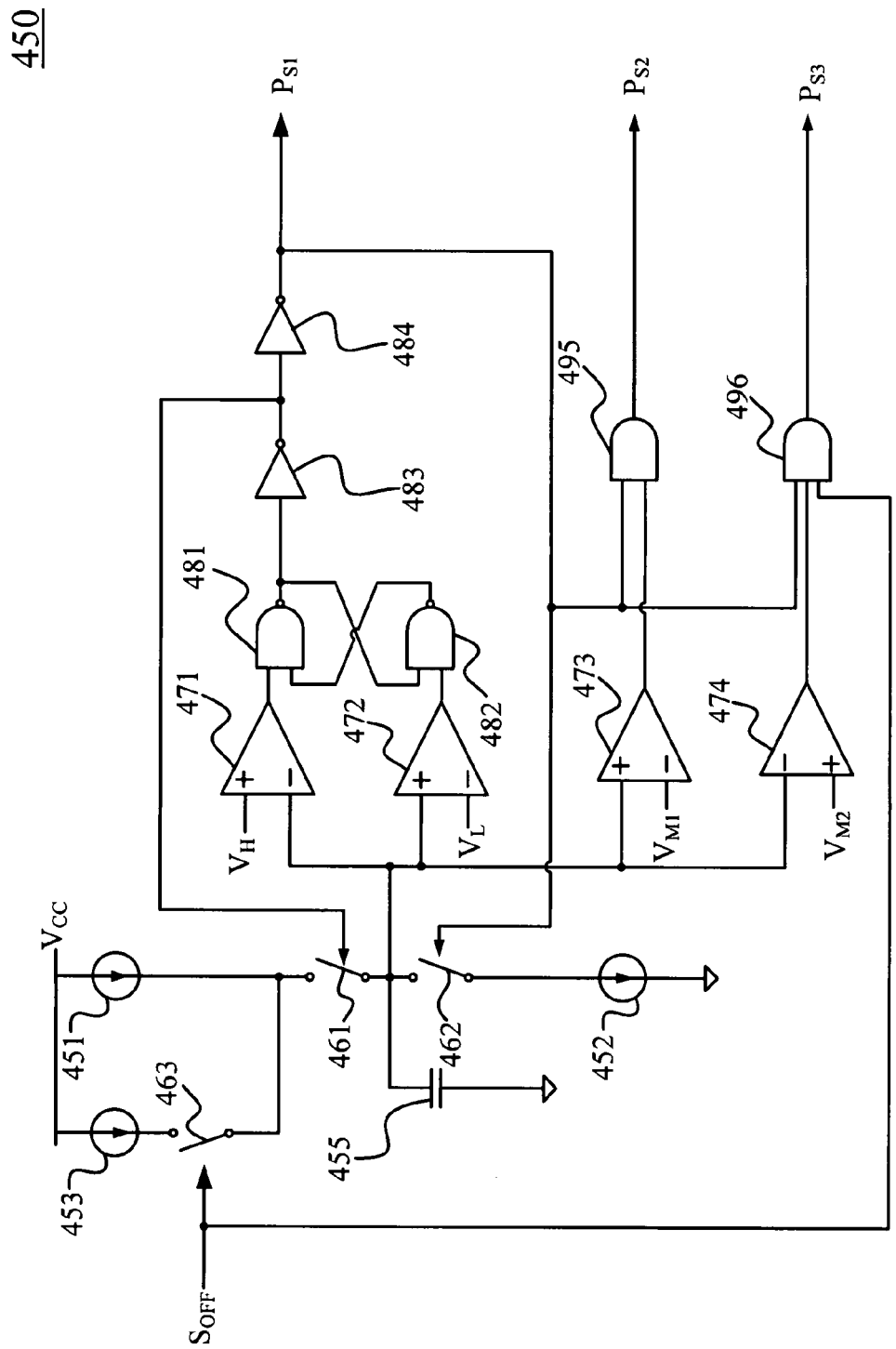
FIG. 5 is a preferred embodiment of an oscillation circuit according to the present invention.

FIG. 5 shows the oscillation circuit 450. It generates the oscillation signals $P_{S1}$, $P_{S2}$ and $P_{S3}$. A current source 451 is coupled to charge a capacitor 455 via a switch 461. A current source 453 is coupled to charge the capacitor 455 via a switch 463 and the switch 461. The current sources 451 and 453 are coupled to the power source $V_{CC}$. Another current source 452 coupled to the ground is coupled to discharge the capacitor 455 through a switch 462. A sawtooth signal is thus generated on the capacitor 455. The capacitor 455 is further connected to comparators 471, 472, 473 and 474. Comparators 471, 472, 473 and 474 have threshold voltages $V_H$, $V_L$, $V_{M1}$ and $V_{M2}$ respectively. NAND gates 481 and 482 develop a SR-latch coupled to the output terminals of the comparators 471 and 472. The output terminal of the NAND gate 481 generates a charge signal through an inverter 483. The charge signal is connected to control the switch 461. The output terminal of the inverter 483 is connected to another inverter 484 to generate the oscillation signal $P_{S1}$. The oscillation signal $P_{S1}$ is also coupled to control the switch 462 and AND gates 495, 496. The input terminal of the AND gate 495 is connected to the output terminal of the comparator 473 for generating the oscillation signal $P_{S2}$. Furthermore, the input terminals of the AND gate 496 are connected to the output terminal of the comparator 474 and the off-control signal $S_{OFF}$ for generating the oscillation signal $P_{S3}$. The off-control signal $S_{OFF}$ is further connected to control the switch 463. The frequency of the oscillation signals $P_{S1}$, $P_{S2}$ and $P_{S3}$ is thus decreased in response to the enable (active low) of the off-control signal $S_{OFF}$.

Figure 6:
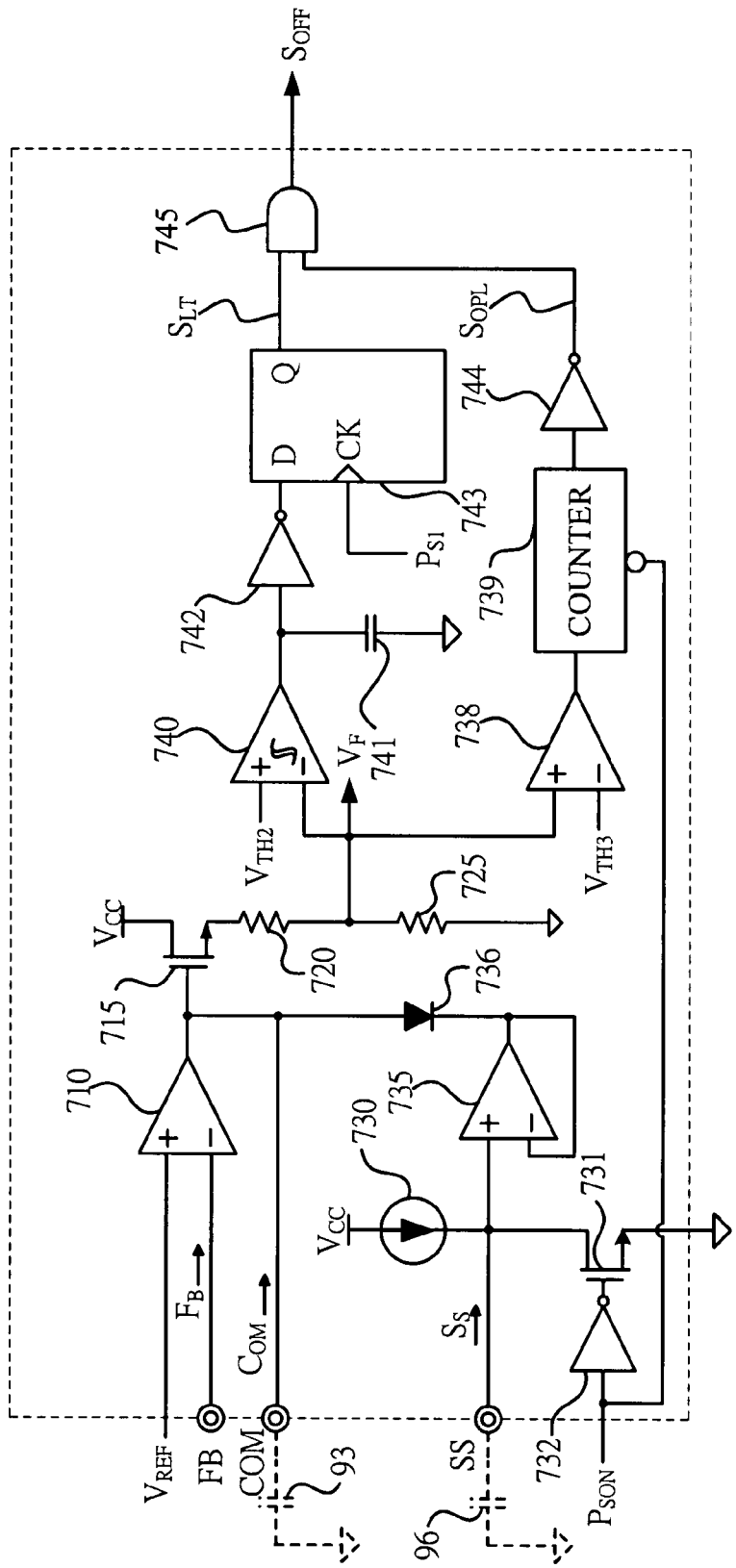
FIG. 6 is a preferred embodiment of a feedback circuit according to the present invention.

FIG. 6 shows the feedback circuit 700. The error amplifier includes an operational amplifier 710, a level-shift transistor 715 and resistors 720, 725. The soft start circuit is developed by a current source 730, a discharge transistor 731, a unit-gain buffer 735, an inverter 732 and a diode 736. A comparator 740, a capacitor 741, an inverter 742 and a flip-flop 743 form the power management circuit. Furthermore, a comparator 738, an up/down counter 739 and an inverter 744 develop the protection circuit for providing the open loop protection.

A reference voltage $V_{REF}$ and the feedback signal $F_B$ are coupled to the input terminals of the operational amplifier 710. The operational amplifier 710 is a trans-conductance amplifier. The operational amplifier 710 has the output terminal COM connected to the capacitor 93 for the loop compensation. The output terminal COM is further controlled by the unit-gain buffer 735 through the diode 736. The input terminal of the unit-gain buffer 735 is coupled to the soft-start signal $S_S$. The current source 730 associates with the capacitor 96 which generates the soft-start signal $S_S$. The current source 730 is coupled to the power source $V_{CC}$. The discharge transistor 731 is used to discharge the capacitor 96 through the inverter 732 in response to the power-on signal $P_{SON}$. Therefore, the soft-start circuit will generate the soft-start signal $S_S$ in response to the power-on signal $P_{SON}$. The power-on signal $P_{SON}$ serves as a reset signal. The level-shift transistor 715 and the resistors 720, 725 provide level shift and attenuation to the output signal of the operational amplifier 710. The error signal $V_F$ is generated at the resistor 725. The level-shift transistor 715 is coupled to the power source $V_{CC}$.

A threshold signal $V_{TH2}$ is connected to the positive input terminal of the comparator 740. The negative input terminal of the comparator 740 is coupled to receive the error signal $V_F$. A power-management signal will be generated at the output terminal of the comparator 740 once the error signal $V_F$ is lower than the threshold signal $V_{TH2}$. The enable of the power-management signal indicates the light load of the power converter. The capacitor 741 is connected to the output terminal of the comparator 740 for providing a debounce. The enable of the power-management signal will generate a light-load signal $S_{LT}$ to the output terminal Q of the flip-flop 743 in response to the oscillation signal $P_{S1}$. The inverter 742 is coupled between the output terminal of the comparator 740 and the input terminal D of the flip-flop 743. The light-load signal $S_{LT}$ is further connected to the input terminal of an AND gate 745 to generate the off-control signal $S_{OFF}$. Another input terminal of the AND gate 745 is connected to an open-loop signal $S_{OPL}$. The open-loop signal $S_{OPL}$ is produced at the output terminal of the up/down counter 739 through the inverter 744. The up/down counter 739 is coupled to receive the power-on signal $P_{SON}$. A threshold $V_{TH3}$ is connected to the negative input terminal of the comparator 738. The positive input terminal of the comparator 738 is coupled to receive the error signal $V_F$.

A protection signal will be generated at the output terminal of the comparator 738 once the error signal $V_F$ is higher than the threshold $V_{TH3}$. The enable of the protection signal indicates the output of the power converter is over-loaded and/or short-circuited. If the protection signal is generated, then the open-loop signal $S_{OPL}$ will be produced after the delay and the debounce of the up/down counter 739. The off-control signal $S_{OFF}$ is thus generated in accordance with the light-load signal $S_{LT}$ and the protection signal. The light-load signal $S_{LT}$ is generated during the light load of the power converter. The protection signal is produced when the feedback of the power converter is open loop.

Figure 7:
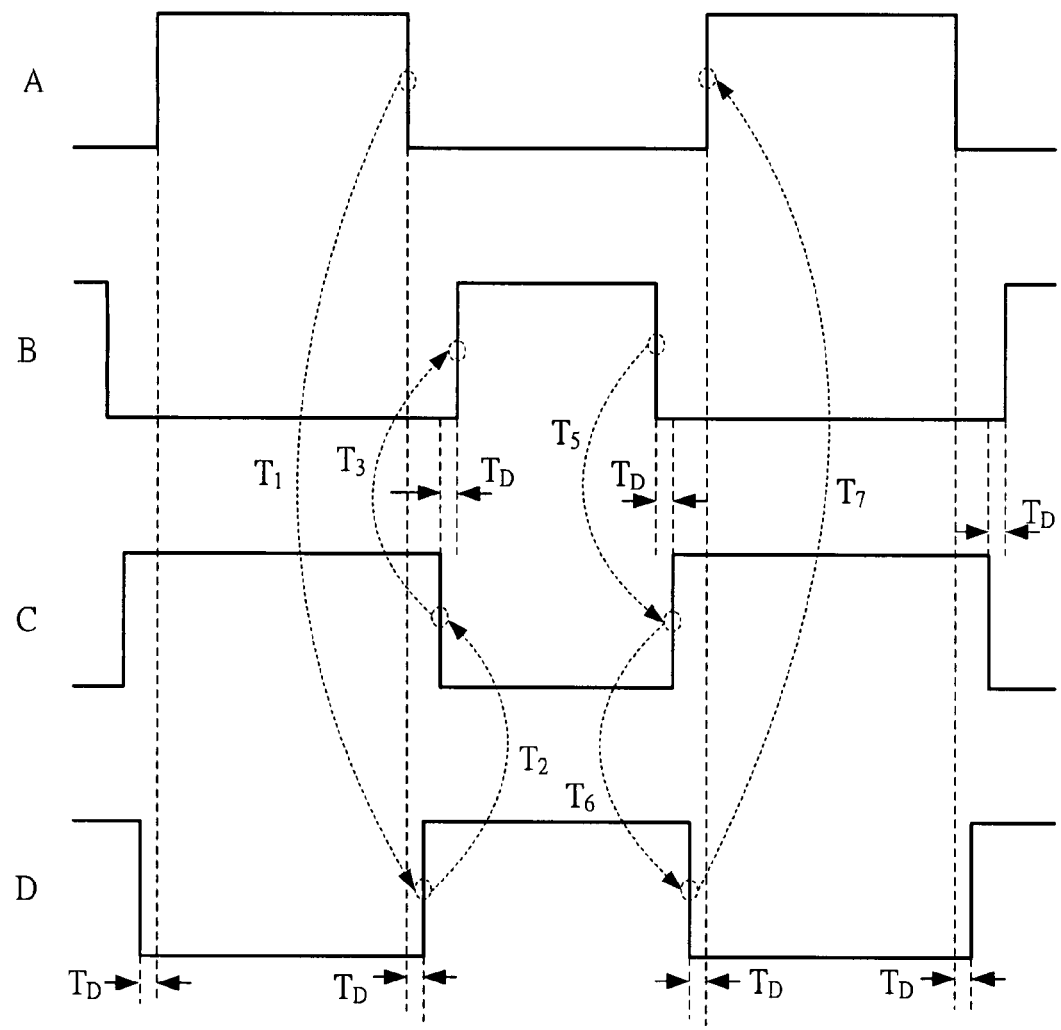
FIG. 7 shows soft switching signal waveforms according to the present invention.

FIG. 7 shows the waveforms of the switching signals A, B, C, D. Referring FIG. 1 and FIG. 7 together, the $T_1$ stage shows the switching signal D will be turned on after a delay time $T_D$ once the switching signal A is turned off. The circular current produced by the leakage inductance $L_{PL}$ (the leakage inductance $L_{PL}$ of the primary winding $N_P$ of the transformer 10) will turn on a diode 36, which results a soft switching on the switching-transistor 35. The leakage inductance $L_{PL}$ and the parasitic capacitance $C_J$ of the switching-transistors 20,30, 35,25 form a resonant tank. Its resonant frequency is $$F_R = \frac{1}{2\pi\sqrt{L_{PL} \times C_J}} \quad (1)$$

The delay time $T_D$ needed for achieving the soft switching is given by, $$T_D = 1/(4 \times F_R) \quad (2)$$

The switching signal C is turned off at $T_2$ stage. The switching signal B is turned on after another delay time $T_D$, the switching-transistor 30 is therefore soft switched after a diode 31 is turned on ($T_3$ stage). The $T_5$ stage shows the switching signal C is turned on after the delay time $T_D$ once the switching signal B is turned off. The circular current will turn on a diode 26 before switching on the switching-transistor 25. The switching signal D is turned off at $T_6$ stage. The switching signal A is turned on after the delay time $T_D$, therefore the switching-transistor 20 is soft switched after a diode 21 is turned on ($T_7$ stage). The delay time $T_D$ generates a phase shift. It means the switching signals A, B, C, D includes phase shifts to achieve soft switching of the switching-transistors 20, 25, 30, 35.

Figure 8:
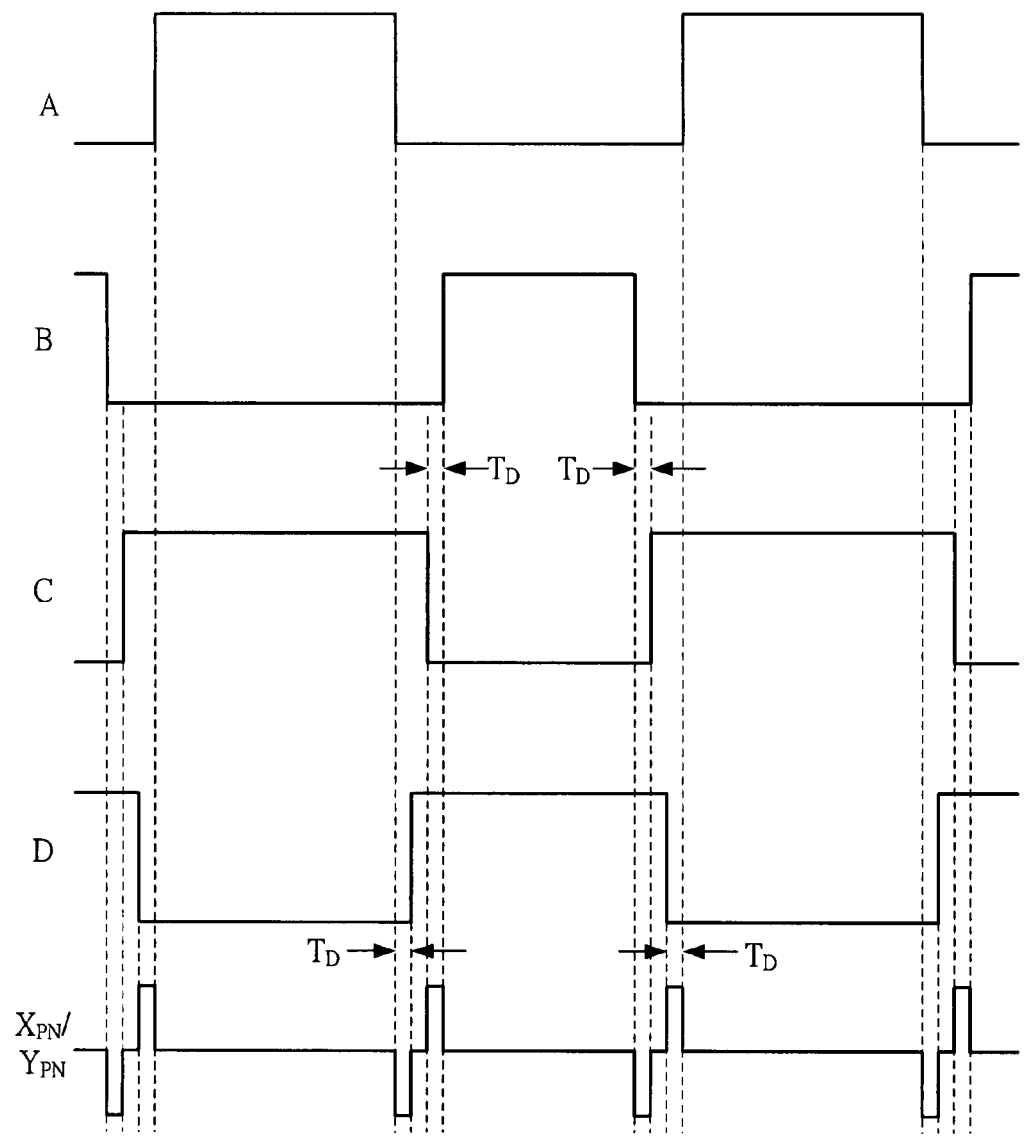
FIG. 8 shows switching signal and synchronous signal waveforms according to the present invention.

FIG. 8 shows the waveforms of the switching signals A, B, C, D, and the synchronous signals $X_{PN}/Y_{PN}$ ($X_P/X_N$ and $Y_P/Y_N$). A negative-polarity synchronous signal $X_{PN}/Y_{PN}$ is generated to turn off the switching signals A and B. A positive-polarity synchronous signal $X_{PN}/Y_{PN}$ is generated to turn on the switching signals A and B. The pulse width of the synchronous signals $X_{PN}/Y_{PN}$ is correlated to the delay time $T_D$ of the switching signals A, B, C and D. The delay time $T_D$ is thus developed between the switching signals A, B, C, and D in response to the synchronous signals $X_{PN}/Y_{PN}$.

Figure 9:
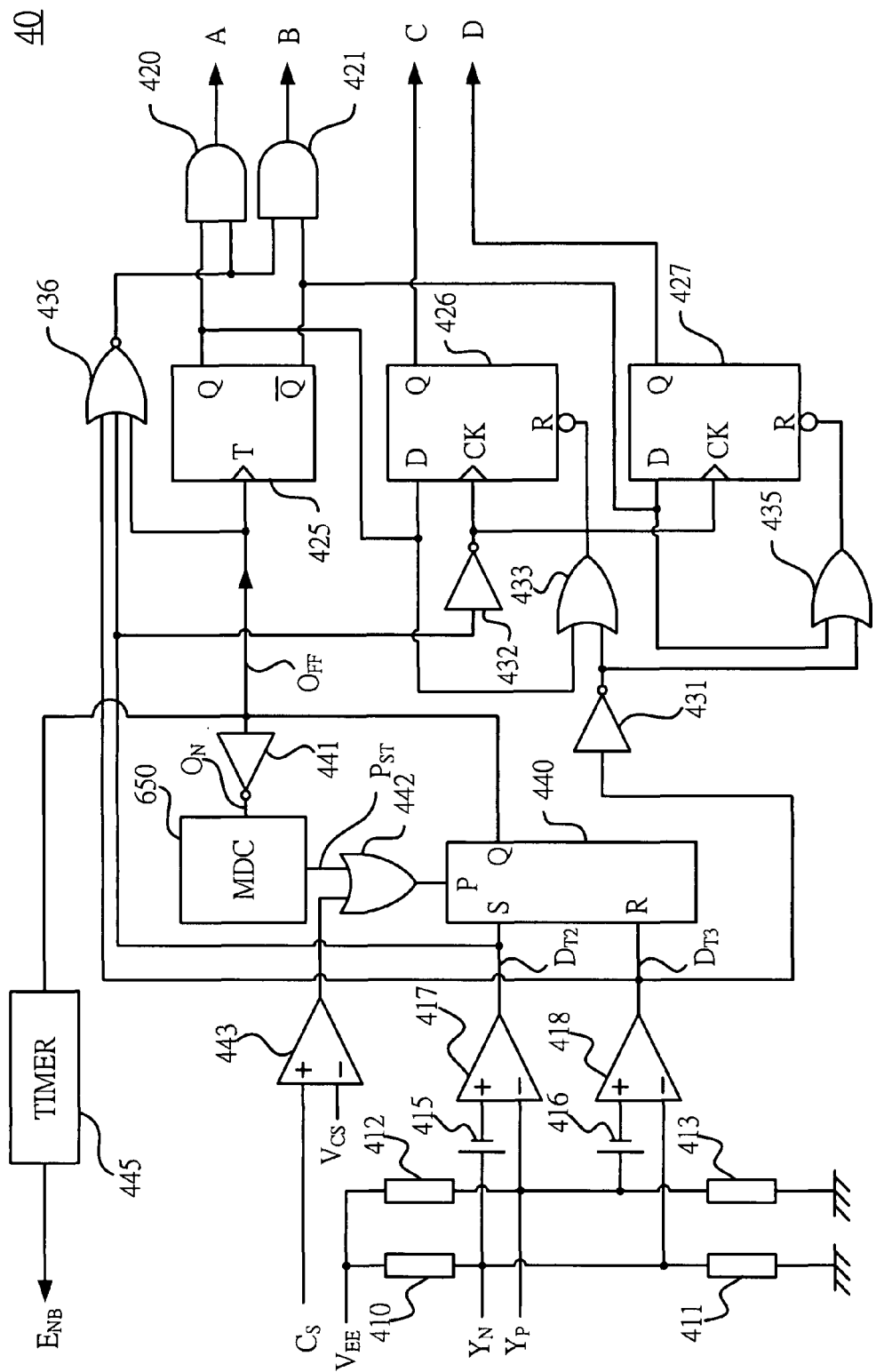
FIG. 9 is a preferred embodiment of a primary-side switching circuit according to the present invention.

FIG. 9 is the circuit schematic of the primary-side switching circuit 40. Resistors 410, 411 and resistors 412, 413 provide bias termination for receiving the synchronous signals $Y_P/Y_N$. The resistors 410, 412 are coupled to the power source $V_{EE}$. The resistors 411, 413 are coupled to the ground. The resistor 410 is coupled to the resistor 411 in series. The resistor 412 is coupled to the resistor 413 in series. Synchronous signals $Y_P/Y_N$ are coupled to comparators 417 and 418.

Comparators 417 and 418 have offset voltages 415 and 416 respectively, which produces hysteresis for the comparison. A delay-time signal $D_{T2}$ is generated at the output terminal of the comparator 417. A delay-time signal $D_{T3}$ is generated at the output terminal of the comparator 418. Delay-time signals $D_{T2}$ and $D_{T3}$ are coupled to the input terminals S and R of a SR-flip-flop 440.

The SR-flip-flop 440, an OR gate 442, an inverter 441, a maximum-duty circuit 650 (MDC) and a comparator 443 form a signal generator to generate an off signal $O_{FF}$ at the output terminal Q of the SR-flip-flop 440. The off signal $O_{FF}$ is generated in response to the synchronous signals $Y_P/Y_N$. The off signal $O_{FF}$ is coupled to turn off the switching signals A, B and change the state of the switching signals A, B, C, D. The maximum-duty circuit 650 is coupled to limit the maximum duty of the switching signals A, B. The preset-input terminal P of the SR-flip-flop 440 is controlled by the output of the OR gate 442. The input of the OR gate 442 is controlled by the output of the comparator 443 and the maximum duty circuit 650. The negative input terminal of the comparator 443 is connected to the over-current threshold $V_{CS}$. The positive input terminal of the comparator 443 is coupled to the current-sense signal $C_S$. The off signal $O_{FF}$ will be generated once the current-sense signal $C_S$ is over the over-current threshold $V_{CS}$. In addition, the output terminal of the SR-flip-flop 440 generates an on signal $O_N$ through the inverter 441. The on signal $O_N$ is coupled to the input terminal of the maximum duty circuit 650. The output terminal of the maximum duty circuit 650 generates a preset signal $P_{ST}$ connected to the input terminal of the OR gate 442. If the off signal $O_{FF}$ is disabled and it is over a maximum-on-time period of the maximum duty circuit 650, then the preset signal $P_{ST}$ will preset the SR-flip-flop 440 to enable the off signal $O_{FF}$.

The off signal $O_{FF}$ is connected to a T-flip-flop 425 for the divide-by-two. The output terminals Q and /Q of the T-flip-flop 425 are connected to the input terminals of AND gates 420 and 421 to generate the switching signals A and B respectively. Another input terminals of the AND gates 420 and 421 are coupled to the off signal $O_{FF}$ through a NOR gate 436. The pulse width of the off signal $O_{FF}$ provides the dead time for the switching signals A and B. The delay-time signal $D_{T2}$ is connected to enable D-flip-flops 426 and 427 via an inverter 432. The D-input terminals of the D-flip-flops 426 and 427 are respectively connected to the output terminals Q and /Q of the T-flip-flop 425.

The output terminal Q of the D-flip-flop 426 generates the switching signal C. The output terminal Q of the D-flip-flop 427 produces the switching signal D. The delay-time signal $D_{T3}$ is coupled to reset the D-flip-flops 426 through an inverter 431 and an OR gates 433. The inverter 431 is coupled between the output terminal of the comparator 418 and the input terminal of the OR gate 433. Another input terminal of the OR gate 433 is controlled by the output terminal Q of the T-flip-flop 425. The output terminal of the OR gate 433 is coupled to the reset-input terminal R of the D-flip-flop 426. The delay-time signal $D_{T3}$ is further coupled to reset the D-flip-flop 427 through the inverter 431 and an OR gate 435. The input terminal of the OR gate 435 is coupled to the output terminal of the inverter 431. Another input terminal of the OR gate 435 is connected to the output terminal /Q of the T-flip-flop 425. The output terminal of the OR gate 435 is coupled to the reset-input terminal R of the D-flip-flop 427. A timer 445 is coupled to receive the off signal $O_{FF}$ for generating the enable signal $E_{NB}$. If the off signal $O_{FF}$ is continuously enabled (disable switching signals A and B) over an expired period of the timer 445, then the enable signal $E_{NB}$ will be generated. Consequently, the disable of the power-on signal $P_{SON}$ will produce the off signal $O_{FF}$ through the synchronous signals $Y_P/Y_N$. The off signal $O_{FF}$ will disable the switching signals A, B and turn off the enable signal $E_{NB}$. After that, the enable signal $E_{NB}$ will turn off the PFC circuit and the power converter.

Figure 10:
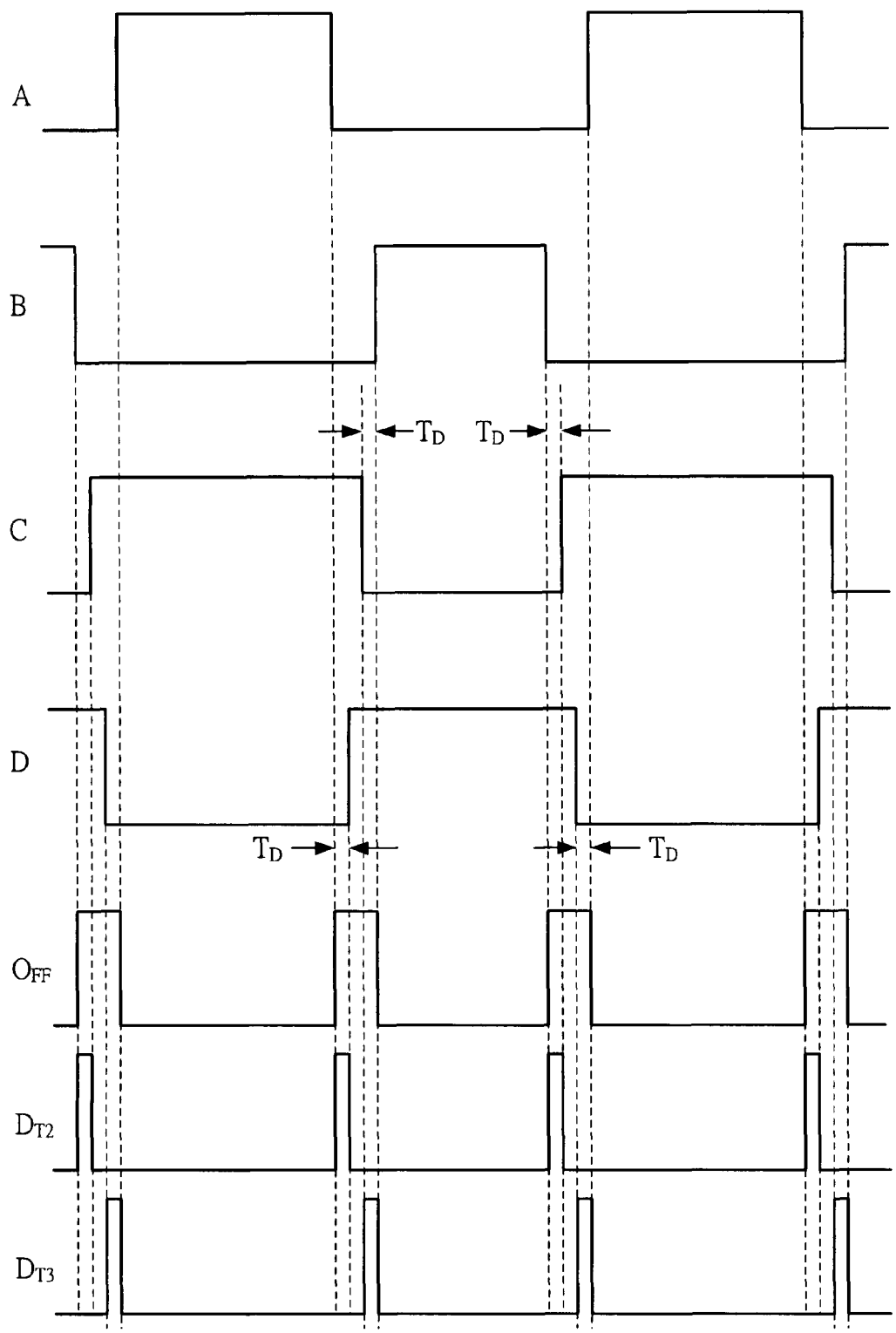
FIG. 10 shows switching signal, the off signal and the delay-time signal waveforms according to the present invention.

FIG. 10 shows the waveforms of the switching signals A, B, C, D, the off signal $O_{FF}$ and the delay-time signals $D_{T2}$, $D_{T3}$. The off signal $O_{FF}$ is a short-pulse signal that provides the dead time for the switching signals A and B. The delay-time signal $D_{T2}$ is generated when the off signal $O_{FF}$ is enabled. The delay-time signal $D_{T3}$ is generated after the delay-time signal $D_{T2}$ is disabled. The delay-time signal $D_{T3}$ is disabled when the off signal $O_{FF}$ is disabled.

Figure 11:
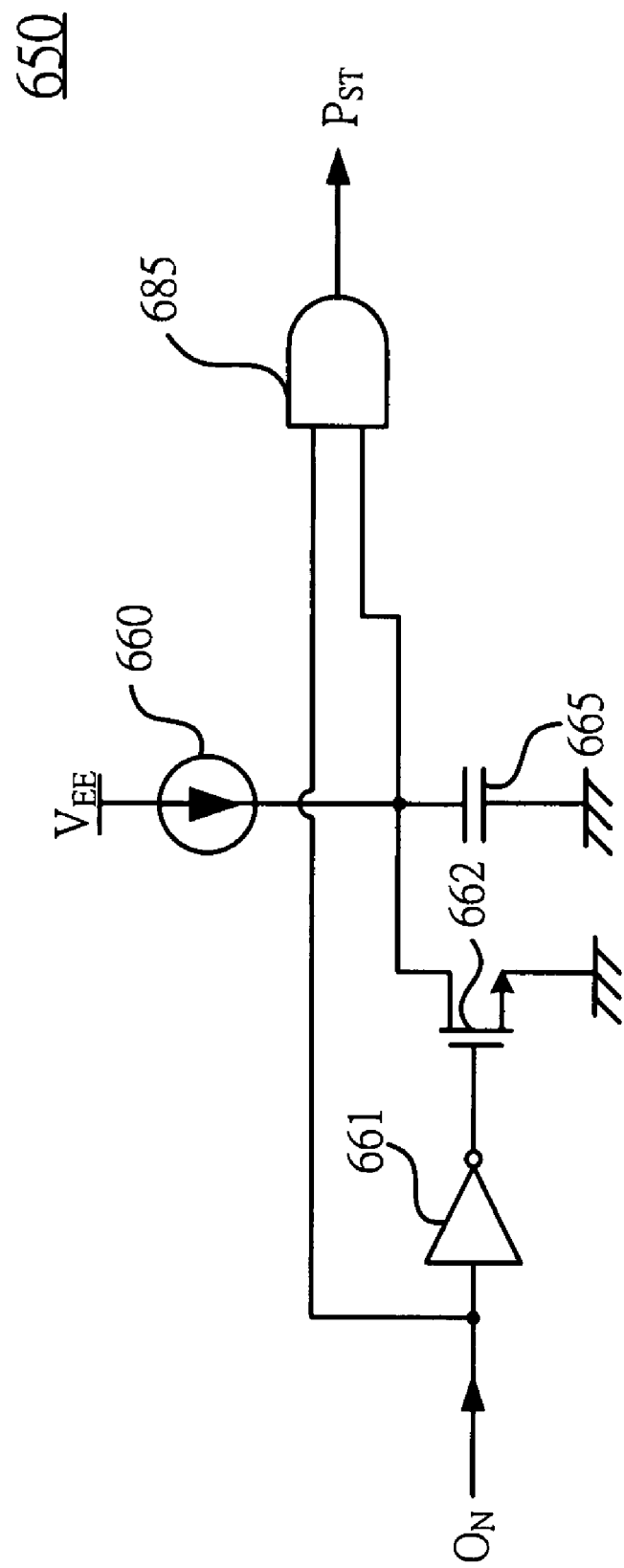
FIG. 11 is a preferred embodiment of a maximum duty circuit (MDC) according to the present invention.

FIG. 11 is the maximum duty circuit 650 (MDC). A current source 660 coupled to the power source $V_{EE}$ is connected to charge a capacitor 665. A transistor 662 is connected to discharge the capacitor 665. The on signal $O_N$ is coupled to control the transistor 662 through an inverter 661. The on signal $O_N$ is further connected to the input terminal of an AND gate 685. Another input terminal of the AND gate 685 is coupled to the capacitor 665. Once the on signal $O_N$ is enabled, the output terminal of the AND gate 685 will generate the preset signal $P_{ST}$ after the maximum-on-time period. The maximum-on-time period is determined by the current of the current source 660 and the capacitance of the capacitor 665.

Figure 12:
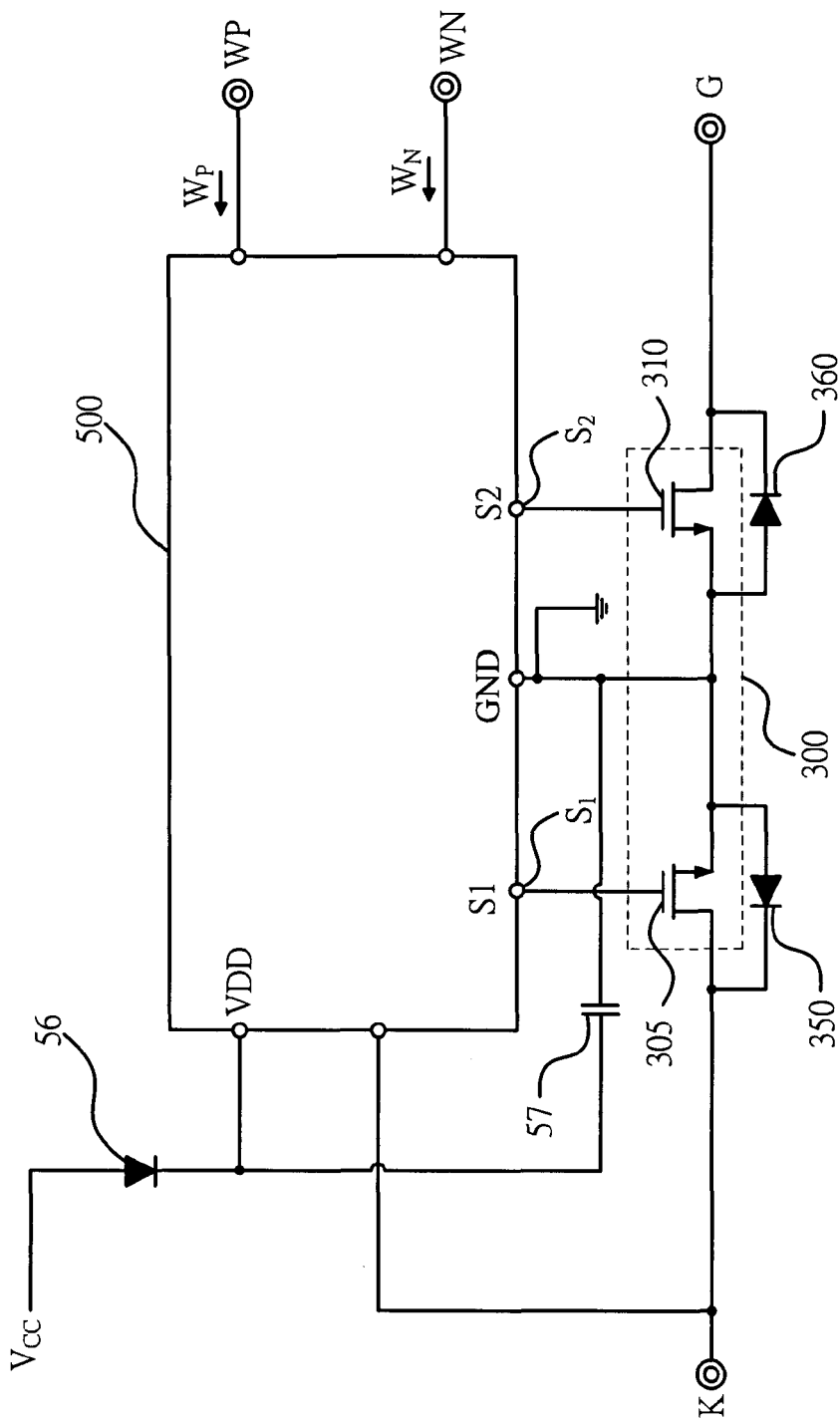
FIG. 12 is the circuit schematic of a synchronous switch according to the present invention.

FIG. 12 is the circuit schematic of a synchronous switch 50. It represents the circuit of the synchronous switches 51 and 52. The synchronous switch 50 includes power switch 300, diodes 350, 360, 56, a capacitor 57 and a control circuit 500. The power switch 300 comprises a first transistor 305 and a second transistor 310. The first diode 350 is connected to the first transistor 305 in parallel. The second diode 360 is connected to the second transistor 310 in parallel. Transistors 305 and 310 are connected in series and back-to-back. Transistors 305 and 310 are further connected between the terminal K and the terminal G. The terminal K is coupled to the secondary side of the transformer 10 (shown in FIG. 1). The terminal K serves to a rectifying terminal. The terminal G is coupled to the output of the power converter. The terminal G serves to a regulated terminal.

A first input terminal and a second input terminal of the control circuit 500 are coupled to receive the pulse signals $W_P/W_N$ for generating a first-control signal $S_1$ and a second-control signal $S_2$ at the terminals $S_1$ and $S_2$. The first-control signal $S_1$ and the second-control signal $S_2$ are coupled to turn on/off the transistors 305 and 310 respectively. The diode 56 and the capacitor 57 form a charge-pump circuit to provide the power supply to the control circuit 500. The power source $V_{CC}$ is connected to charge the capacitor 57 through the diode 56. A VDD terminal and GND terminal of the control circuit 500 are parallel connected to the capacitor 57. The GND terminal is further connected to the sources of the transistors 305 and 310. The GND terminal is coupled to the ground.

Figure 13:
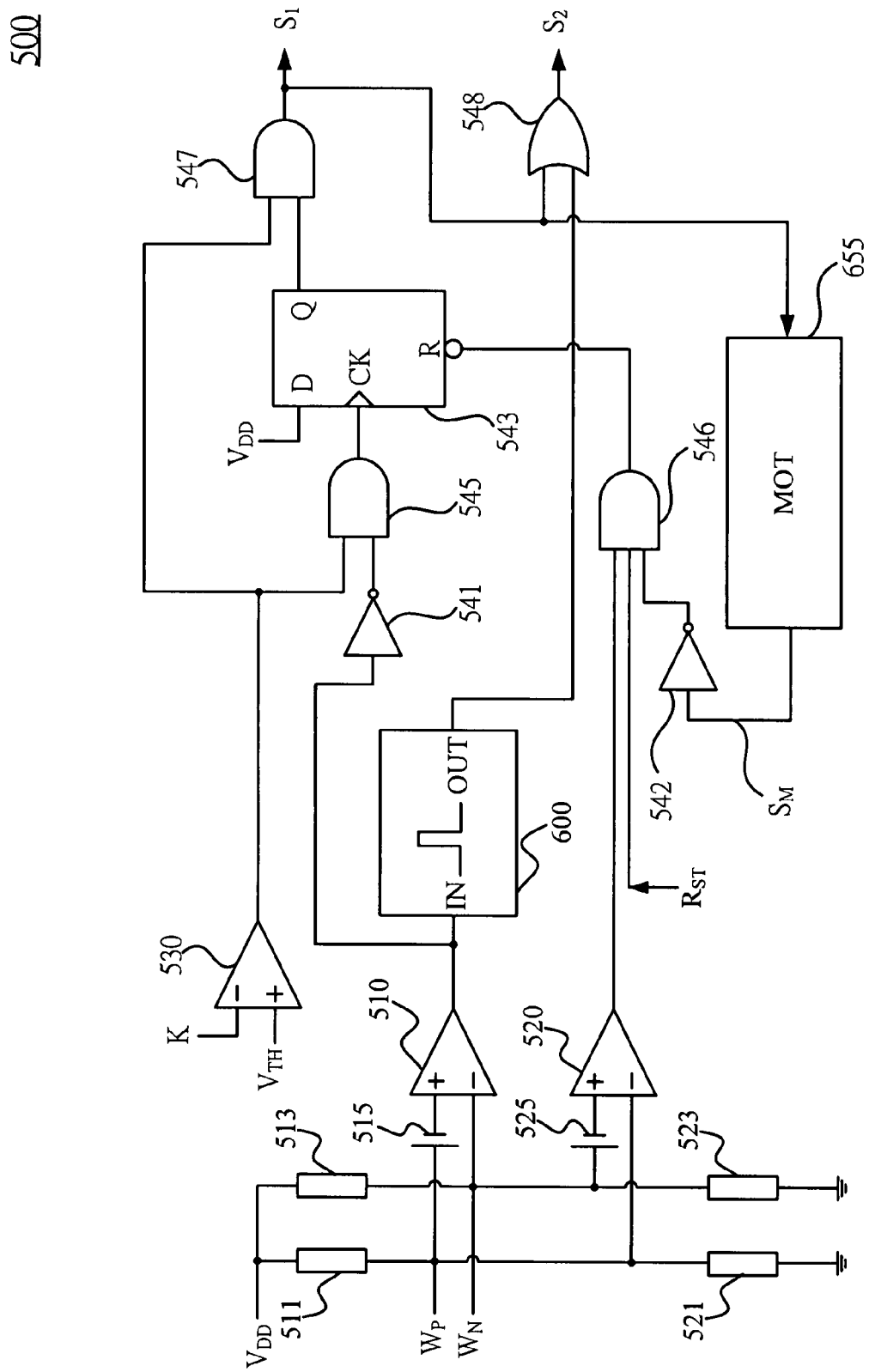
FIG. 13 is a preferred embodiment of a control circuit according to the present invention.

FIG. 13 is a preferred embodiment of the control circuit 500. Resistors 511, 521 and 513, 523 provide the bias termination for receiving the pulse signals $W_P/W_N$. The resistors 511, 513 are coupled to the power source $V_{DD}$. The resistors 521, 523 are coupled to the ground. The resistor 511 is coupled to the resistor 521 in series. The resistor 513 is coupled to the resistor 523 in series. Pulse signals $W_P/W_N$ are coupled to comparators 510 and 520. Comparators 510 and 520 have offset voltages 515 and 525 respectively, which produces hysteresis for the comparison. A comparator 530 having a threshold $V_{TH}$ connects to its positive input terminal. The negative input terminal of the comparator 530 is coupled to the terminal K. The output terminal of the comparator 510 is coupled to enable a D-flip-flop 543 through an inverter 541 and an AND gate 545. The D-flip-flop 543 is operated as a latch circuit to receive the pulse signals $W_P/W_N$ for set or reset the latch circuit in response to the polarity of the pulse signals $W_P/W_N$. The inverter 541 is coupled between the output terminal of the comparator 510 and the input terminal of the AND gate 545. Another input terminal of the AND gate 545 is connected to the output terminal of the comparator 530. The output terminal of the AND gate 545 is coupled to the D-flip-flop 543.

The input terminal D of the D-flip-flop 543 is coupled to the power source $V_{DD}$. The reset-input terminal R of the D-flip-flop 543 is controlled by the output of the comparator 520 via an AND gate 546. The output terminal Q of the D-flip-flop 543 and the output terminal of the comparator 530 are connected to the input terminals of an AND gate 547. The first-control signal $S_1$ is generated at the output terminal of the AND gate 547 for controlling the on/off of the first transistor 305 (shown in FIG. 12). Therefore, the on/off of the first transistor 305 is controlled in accordance with the status of the D-flip-flop 543. The maximum on time of the first-control signal $S_1$ is limited by a maximum-on-time circuit 655 (MOT). The first-control signal $S_1$ is connected to the maximum-on-time circuit 655. After a blanking time, a maximum-on-time signal $S_M$ will be produced in response to the enable of the first-control signal $S_1$. The maximum-on-time signal $S_M$ is connected to the input terminal of the AND gate 546 via an inverter 542. Another input terminal of the AND gate 546 is connected to a power-on reset signal $R_{ST}$. The output terminal of the AND gate 546 is couple to reset the D-flip-flop 543. The maximum on time of the first-control signal $S_1$ is thus limited by the blanking time of the maximum-on-time circuit 655. The first-control signal $S_1$ will turn off the first transistor 305 once the pulse signals $W_P/W_N$ is generated as, $$V_{WN} - V_{WP} > V_{525} \qquad (3)$$

The first-control signal $S_1$ will turn on the first transistor 305 when equations (4) and (5) are met, $$V_{WP} - V_{WN} > V_{515} \qquad (4)$$

$$V_K < V_{TH} \qquad (5)$$

where $V_{WP}$ and $V_{WN}$ is the voltage of the pulse signals $W_P/W_N$; $V_K$ is the voltage of the terminal K; $V_{TH}$ is the voltage of the threshold $V_{TH}$; $V_{515}$ is the value of the offset voltage 515; $V_{525}$ is the value of the offset voltage 525.

The voltage of the terminal K will be lower than the voltage of the threshold $V_{TH}$ once the first diode 350 (shown in FIG. 12) is conducted. The first transistor 305 can only be turned on after the first diode 350 is turned on, which synchronizes the switching and the polarity of the transformer 10 (shown in FIG. 1), and achieves the soft switching of the first transistor 305. The second-control signal $S_2$ is generated at the output terminal of an OR gate 548 for switching the on/off of the second transistor 310 (shown in FIG. 12). The input terminal of the OR gate 548 is connected to the first-control signal $S_1$. The second input terminal of the OR gate 548 is controlled by a one-shot signal generator 600. The input terminal of the one-shot signal generator 600 is connected to the output terminal of the comparator 510. Therefore, the second-control signal $S_2$ is generated in response to the pulse signals $W_P/W_N$. After that, the on/off of the second-control signal $S_2$ is corresponding to the first-control signal $S_1$.

Figure 14:
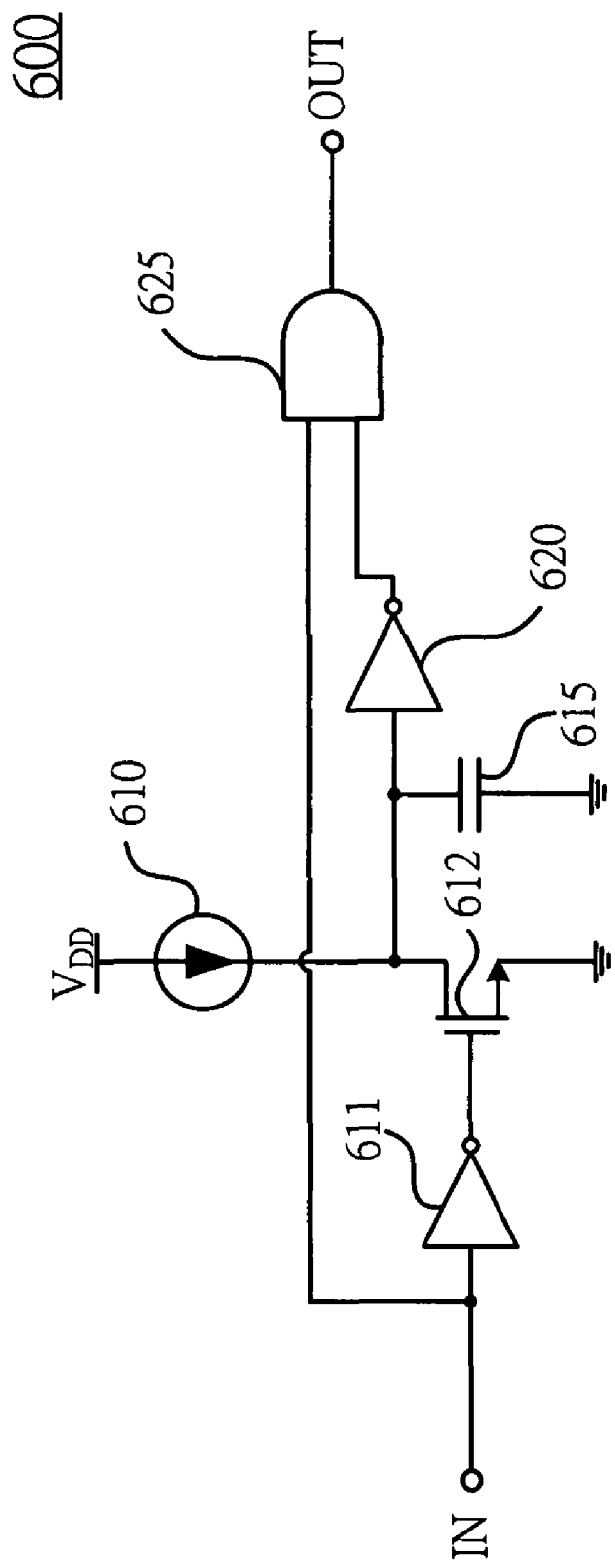
FIG. 14 shows the circuit schematic of a one-shot signal generator according to the present invention.

FIG. 14 shows the circuit schematic of the one-shot signal generator 600. A current source 610 coupled to the power source $V_{DD}$ is connected to charge a capacitor 615. A transistor 612 is connected to discharge the capacitor 615. The input signal is coupled to control the transistor 612 through an inverter 611. The input signal is further connected to the input terminal of an AND gate 625. Another input terminal of the AND gate 625 is coupled to the capacitor 615 via an inverter 620. The output terminal of the AND gate 625 generates the output signal of the one-shot signal generator 600. When the input signal is a logic-low, the capacitor 615 is discharged and the output of the AND gate 625 is the logic-low. When the input signal is changed to the logic-high, the current source 610 will start to charge the capacitor 615. The AND gate 625 will output an one-shot signal. The current of the current source 610 and the capacitance of the capacitor 615 determine the pulse width of the one-shot signal.

Figure 15:
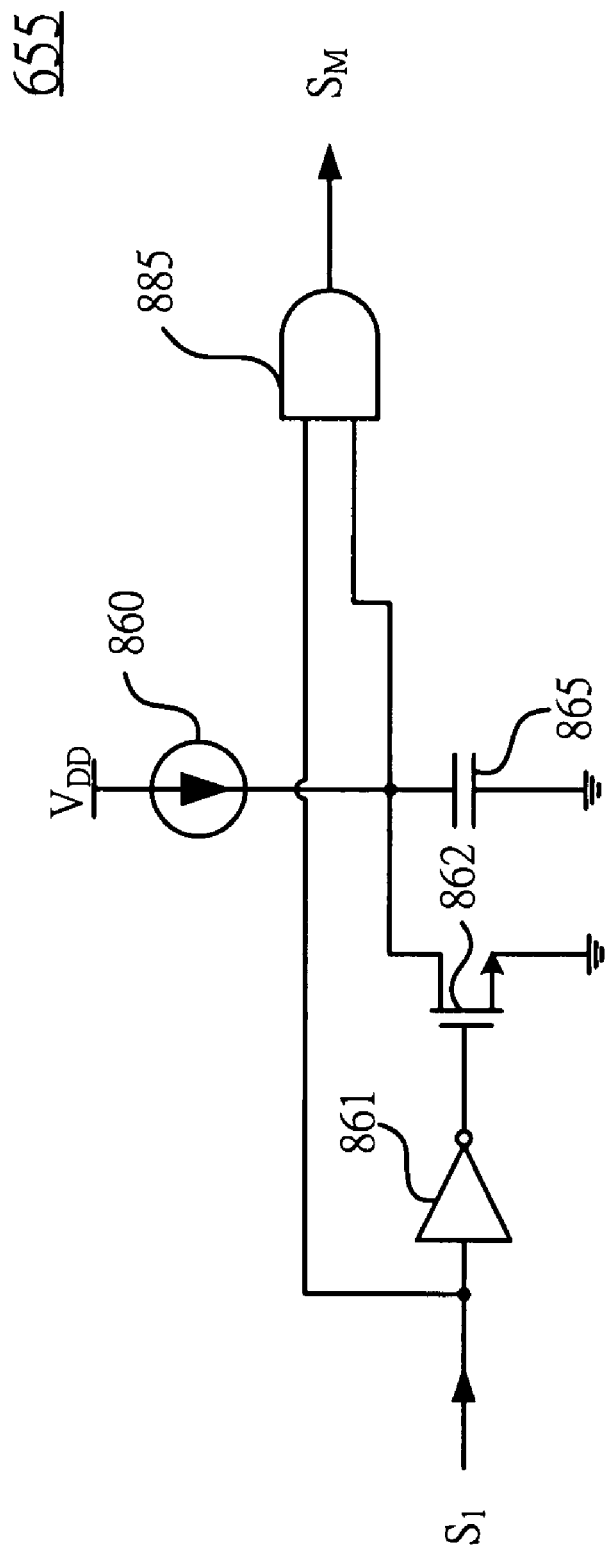
FIG. 15 is a preferred embodiment of another maximum-on-time (MOT) circuit according to the present invention.

FIG. 15 is the maximum-on-time circuit 655 (MOT). A current source 860 coupled to the power source $V_{DD}$ is connected to charge a capacitor 865. A transistor 862 is connected to discharge the capacitor 865. The first-control signal $S_1$ is coupled to control the transistor 862 through an inverter 861. The first-control signal $S_1$ is further connected to the input terminal of an AND gate 885. Another input terminal of the AND gate 885 is coupled to the capacitor 865. Once the first-control signal $S_1$ is enabled, the output terminal of the AND gate 885 will generate the maximum-on-time signal $S_M$ to disable the first-control signal $S_1$ after the blanking time. The blanking time is determined by the current of the current source 860 and the capacitance of the capacitor 865.

Figure 16:
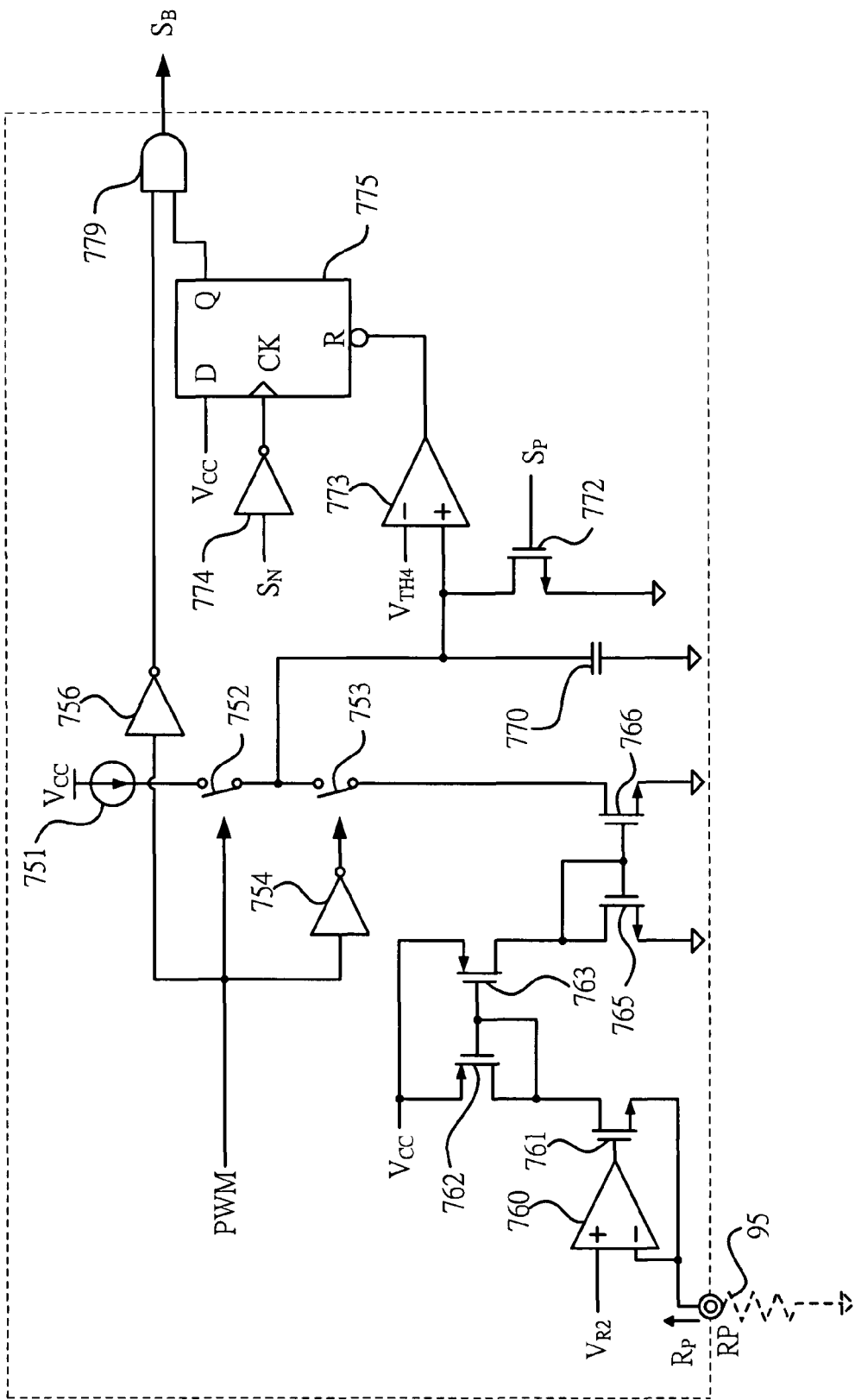
FIG. 16 is a preferred embodiment of a linear-predict circuit according to the present invention.

FIG. 16 shows the linear-predict circuit 750. The linear-predict circuit 750 is developed to turn off the flyback switch 70 (shown in FIG. 1) when the power converter is operated in the discontinuous current mode. Turning off the flyback switch 70 will prevent a reverse current flowed from the output capacitor 85 (shown in FIG. 1) to the flyback switch 70 during the discontinuous current mode. A current source 751 is coupled to charge a capacitor 770 via a switch 752. The current source 751 is coupled to the power source $V_{CC}$. The switch 752 is coupled between the current source 751 and the capacitor 770. A discharge-current is coupled to discharge the capacitor 770 through a switch 753. The PWM signal is coupled to control the switch 752. The PWM signal is further coupled to control the switch 753 via an inverter 754. An operational amplifier 760, the resistor 95 and transistors 761, 762, 763, 765 and 766 develop a voltage-to-current converter. The operational amplifier 760 is coupled to receive the program signal $R_P$ for generating the discharge-current via the transistor 766. The program signal $R_P$ is generated in accordance with a reference voltage $V_{R2}$ and the resistance of the resistor 95. The reference voltage $V_{R2}$ is coupled to the input terminal of the operational amplifier 760. The output terminal and another input terminal of the operational amplifier 760 are coupled to the transistor 761. The transistors 762, 763 develop a current mirror and coupled to the transistor 761. The transistors 765, 766 develop another current mirror and coupled to the transistor 763 to generate the discharge-current.

The capacitor 770 is charged in response to the enable of the PWM signal, and discharged in response to the disable of the PWM signal. Additionally, the pulse signal $S_P$ is coupled to discharge the capacitor 770 via a transistor 772. The transistor 722 is coupled to the capacitor 770 and the pulse signal $S_P$. A linear-predict signal is thus generated in the capacitor 770. The pulse signal $S_N$ is coupled to enable a D-flip-flop 775 through an inverter 774. The inverter 774 is coupled between the pulse signal $S_N$ and the D-flip-flop 775. The PWM signal and the output of the D-flip-flop 775 are connected to enable an AND gate 779 for producing the drive signal $S_B$ once the PWM signal is disabled.

An inverter 756 is coupled between the PWM signal and the input terminal of the AND gate 779. The output terminal Q of the D-flip-flop 775 is coupled to another input terminal of the AND gate 779. The input terminal D of the D-flip-flop 775 is coupled to the power source $V_{CC}$. The reset-input terminal R of the D-flip-flop 775 is connected to the output terminal of a comparator 773. A threshold voltage $V_{TH4}$ is connected to the negative input terminal of the comparator 773. The positive input terminal of the comparator 773 is connected to the capacitor 770 to receive the linear-predict signal. When the linear-predict signal is lower than the threshold voltage $V_{TH4}$, the comparator 773 will reset the D-flip-flop 775 to disable the drive signal $S_B$. The drive signal $S_B$ is therefore generated in response to the program signal $R_P$ and the pulse width of the PWM signal.

When the power converter operated in the boundary mode, the magnetized flux $\phi_C$ of the inductor 80 (shown in FIG. 1) is equal to its demagnetized flux $\phi_D$. The boundary mode means the power converter is operated between the continuous current mode and the discontinuous current mode.

The equality is shown as, $$\Phi_C = \Phi_D \tag{6}$$

$$\Phi = B \times Ae = \frac{V \times T}{N} \tag{7}$$

$$\left[\left(\frac{V_{IN} \times N_S}{N_P}\right) - V_O\right] \times T_{CHARGE} = V_O \times T_{DISCHARGE} \tag{8}$$

$$T_{DISCHARGE}\left\{\left[\left(\frac{V_{IN} \times N_S}{N_P}\right) - V_O\right] / V_O\right\} \times T_{CHARGE} \tag{9}$$

$$T_{DISCHARGE} = K \times T_{CHARGE} \tag{10}$$

where B is the flux density; Ae is the cross-section area of the inductor 80; $N_S/N_P$ is the turn ratio of the transformer 10; the magnetized time ($T_{CHARGE}$) is equivalent to the pulse width of the PWM signal; the demagnetized time ($T_{DISCCHARGE}$) of the inductor 80 indicates the boundary condition of the power converter.

The demagnetized time $T_{DISCHARGE}$ of the inductor 80 can be obtained in accordance with the equation (9). It also shows the demagnetized time $T_{DISCHARGE}$ can be predicted in accordance with the input voltage $V_{IN}$ (shown in FIG. 1), the output voltage $V_O$ (shown in FIG. 1) and the magnetized time $T_{CHARGE}$ (the pulse width of the PWM signal). If the input voltage $V_{IN}$ and the output voltage $V_O$ can be set as constant, the demagnetized time $T_{DISCHARGE}$ could be predicted by the equation (10), in which the K value is programmed by the program signal $R_P$. Therefore, the on time of the drive signal $S_B$ can be generated in accordance with the demagnetized time $T_{DISHARGE}$ shown in the equation (10).

Figure 17:
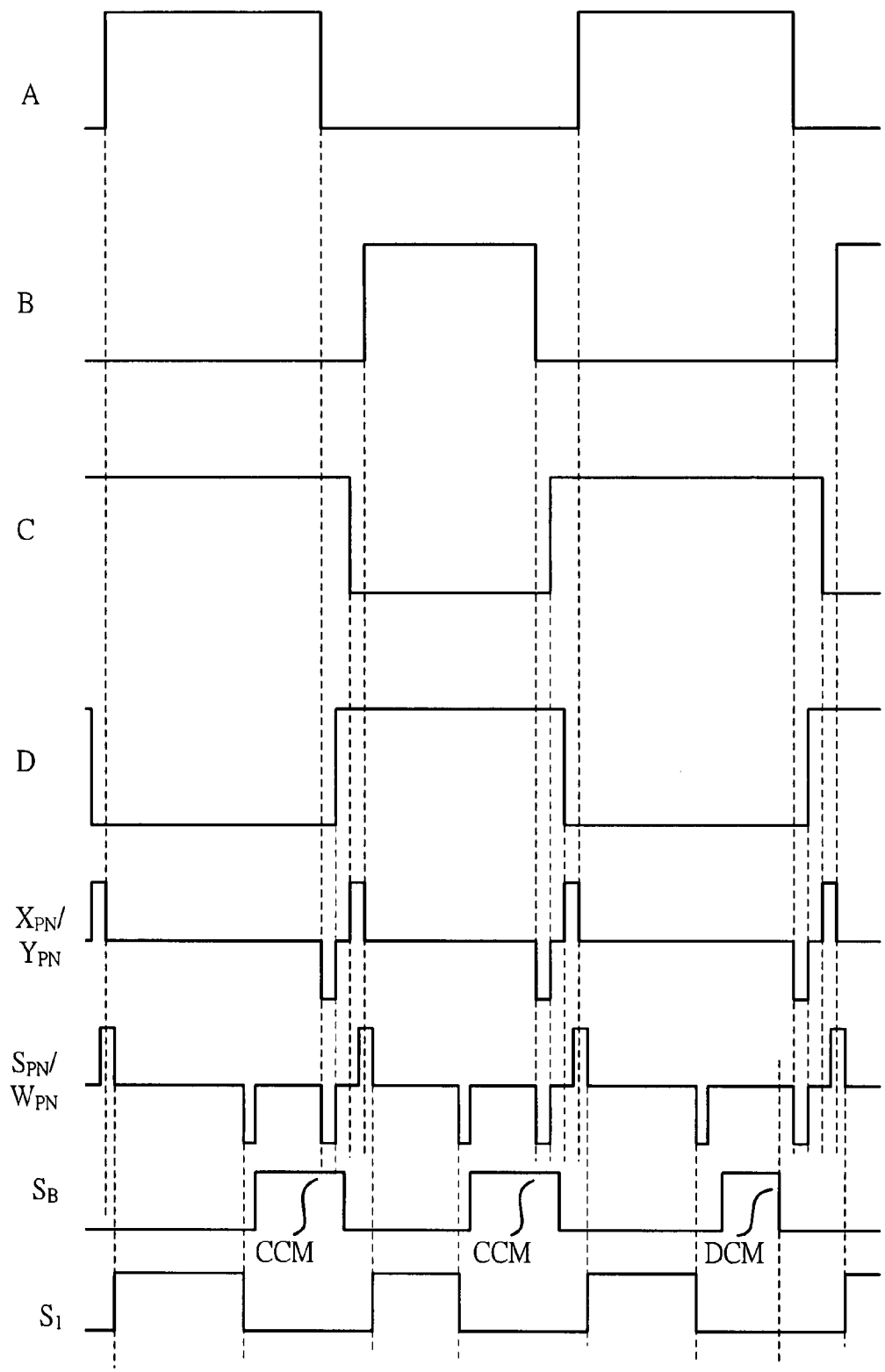
FIG. 17 shows switching signal, synchronous signal, pulse signal, first-control signal and drive signal waveforms according to the present invention.

FIG. 17 shows waveforms of the switching signals A, B, C, D, the synchronous signals $X_{PN}/Y_{PN}$, the pulse signals $S_{PN}/W_{PN}$ ($S_P/S_N$ and $W_P/W_N$), the first-control signal $S_1$ and the drive signal $S_B$. The drive signal $S_B$ is disabled before the power converter operated in the discontinuous current mode (the inductor 80 is fully demagnetized).

Figure 18:
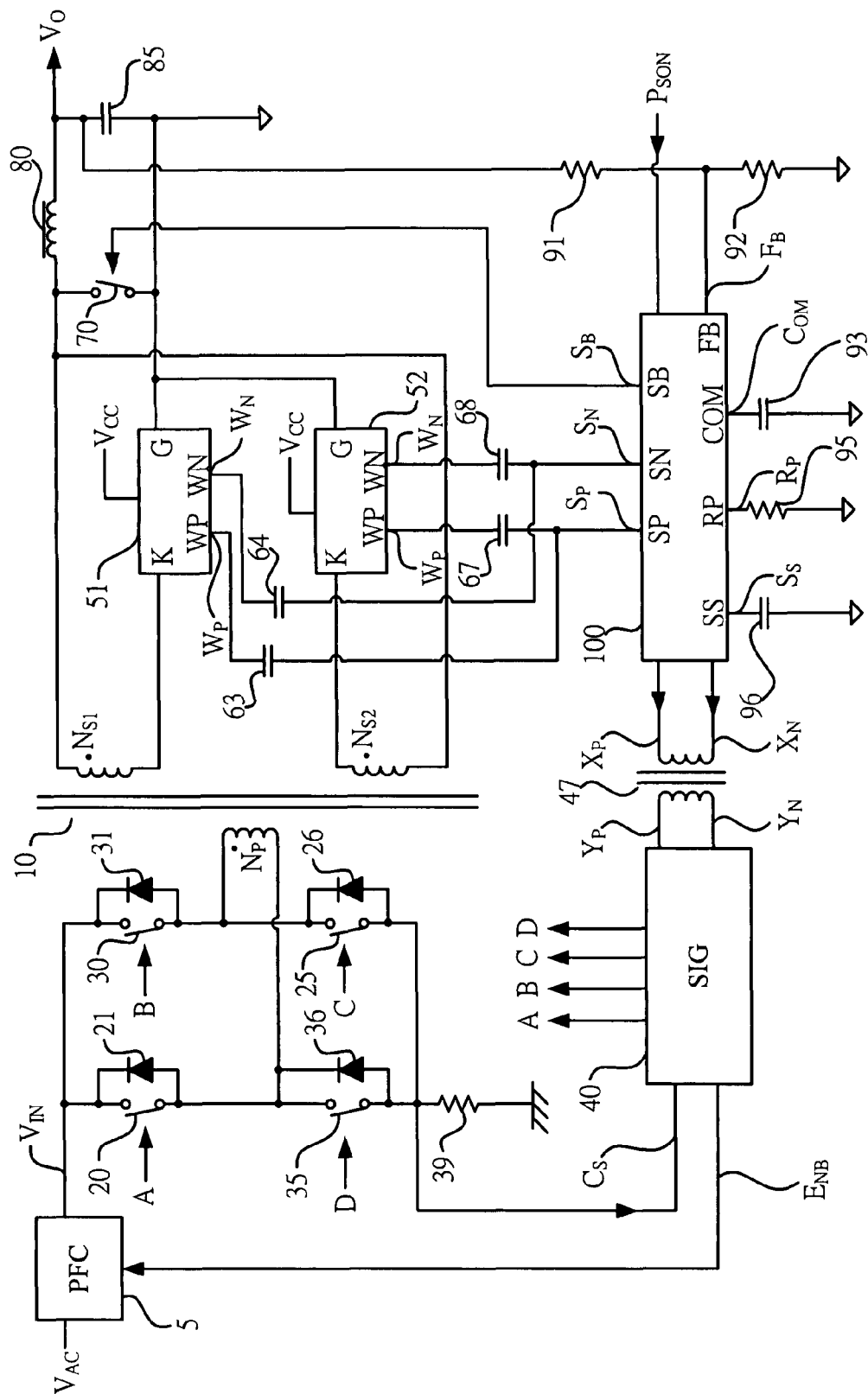
FIG. 18 shows another preferred embodiment of an offline power converter with synchronous regulation circuit according to the present invention, in which a pulse transformer is operated as the isolation device.

FIG.18 shows another preferred embodiment of a power converter with synchronous regulation circuit, wherein the most circuits are the same as the last embodiment, so the description is omitted here. The difference is a pulse transformer 47 is operated as the isolation device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An offline synchronous regulation power converter, comprising:
    a secondary-side switching circuit coupled to the output of the power converter to generate a pulse signal and a synchronous signal in response to a feedback signal;
    an isolation device coupled to the secondary-side switching circuit for transferring the synchronous signal from the secondary side of the power converter to the primary side of the power converter;
    a primary-side switching circuit generating a switching signal to switch a primary winding of a transformer in response to the synchronous signal; and
    a synchronous switch having a power switch and a control circuit, the power switch coupled from a secondary winding of the transformer to the output of the power converter, the control circuit receiving the pulse signal for turning on/off the power switch;
    wherein the feedback signal is correlated to the output of the power converter, the pulse signal is generated for rectifying and regulating of the power converter, the polarity of the pulse signal determines the on/off of the power switch.

2. The synchronous regulation power converter as claimed in claim 1, wherein the pulse signal is coupled from the secondary-side switching circuit to the synchronous switch through capacitors.

3. The synchronous regulation power converter as claimed in claim 1, further comprising:
    switching-transistors coupled to switch the transformer in accordance with the switching signal;
    wherein the switching signal includes phase shifts to achieve soft switching of switching-transistors, the phase shifts of the switching signal are generated in accordance with the synchronous signal.

4. The synchronous regulation power converter as claimed in claim 1, wherein the primary-side switching circuit further comprises:
    a timer generating an enable signal in response to the synchronous signal;
    wherein the enable signal is coupled to control the on/off of a PFC circuit of the power converter.

5. The synchronous regulation power converter as claimed in claim 1, wherein the primary-side switching circuit further comprises:
    a maximum-duty circuit coupled to limit the maximum duty of the switching signal in response to the synchronous signal.

6. The synchronous regulation power converter as claimed in claim 1, further comprising:
    a current-sense device generating a current-sense signal in response to the switching current of the transformer;
    wherein the current-sense signal is coupled to the primary-side switching circuit to disable the switching signal once the current-sense signal is over an over-current threshold.

7. The synchronous regulation power converter as claimed in claim 1, wherein the power switch comprises a first transistor and a second transistor connected in series, the first transistor has a first diode connected in parallel, the second transistor has a second diode connected in parallel.

8. The synchronous regulation power converter as claimed in claim 7, wherein the control circuit generates a first-control signal and a second-control signal to control the first transistor and the second transistor respectively, the first transistor can be turned on once the first diode is conducted.

9. The synchronous regulation power converter as claimed in claim 1, wherein the isolation device is a pulse transformer or capacitors.

10. The synchronous regulation power converter as claimed in claim 1, further comprising:
    a flyback switch coupled to the power switch to freewheel an inductor current of the power converter;
    wherein the flyback switch is turned on in response to the off of the power switch, the on time of the flyback switch is correlated to the on time of the power switch.

11. The synchronous regulation power converter as claimed in claim 1, wherein the secondary-side switching circuit comprises:
    a programming device generating a program signal; and
    a linear-predict circuit generating a drive signal in response to the program signal and the pulse signal;
    wherein the drive signal is coupled to control a flyback switch.

12. The synchronous regulation power converter as claimed in claim 1, wherein the secondary-side switching circuit comprises:
    an oscillation circuit generating oscillation signals for generating the synchronous signal;
    a PWM circuit generating a PWM signal in response to the oscillation signals;
    an error amplifier coupled to the output of the power converter to receive the feedback signal and generate an error signal;
    a ramp circuit generating a ramp signal in response to the PWM signal; and
    a pulse signal generator generating the pulse signal in accordance with the PWM signal;
    wherein the synchronous signal is a differential signal, the polarity of the synchronous signal determines the on/off of switching-transistors to switch the transformer, the PWM signal is enabled in response to the oscillation signals, the PWM signal is disabled in response to the oscillation signals and a clear signal, the clear signal is generated by the PWM circuit in response to the error signal and the ramp signal, the pulse signal is a differential signal, the polarity of the pulse signal determines the on/off of the power switch.

13. The synchronous regulation power converter as claimed in claim 12, wherein the secondary-side switching circuit further comprises:
    a soft-start circuit generating a soft-start signal in response to a reset signal;
    wherein the soft-start signal is coupled to control the pulse width of the PWM signal.

14. The synchronous regulation power converter as claimed in claim 12, wherein the secondary-side switching circuit further comprises:
    a power management circuit coupled to receive the error signal for generating a light-load signal;
    wherein the light-load signal is coupled to on/off the switching signal during the light load of the power converter.

15. The synchronous regulation power converter as claimed in claim 1, wherein the synchronous switch comprises:
    a rectifying terminal coupled to the secondary side of the transformer;

a regulated terminal coupled to the output of the power converter;
a first input terminal; and
a second input terminal;
wherein the power switch is connected in between the rectifying terminal and the regulated terminal, the first input terminal and the second input terminal are coupled to receive the pulse signal for turning on/off the power switch.

16. The synchronous regulation power converter as claimed in claim 1, wherein the control circuit comprises a latch circuit coupled to receive the pulse signal for set or reset the latch circuit, the latch circuit is coupled to turn on/off the power switch.

17. A synchronous regulation circuit for offline power converter, comprising:
a secondary-side switching circuit coupled to the output of the power converter to generate a pulse signal and a synchronous signal in response to a feedback signal;
a primary-side switching circuit generating a switching signal to switch a transformer in response to the synchronous signal;
a power switch coupled from the transformer to the output of the power converter; and
a control circuit coupled to receives the pulse signal for turning on/off the power switch;
wherein the feedback signal is correlated to the output of the power converter, the pulse signal is a differential signal that is coupled to control the power switch for rectifying and regulating of the power converter, the synchronous signal is also a differential signal that is coupled from the secondary-side switching circuit to the primary-side switching circuit to generate the switching signal.

18. The synchronous regulation circuit as claimed in claim 17, wherein the synchronous signal is coupled from the secondary-side switching circuit to the primary-side switching circuit through an isolation device to generate the switching signal.

19. The synchronous regulation circuit as claimed in claim 17, wherein the pulse signal is coupled from the secondary-side switching circuit to the control circuit through capacitors.

20. The synchronous regulation circuit as claimed in claim 17, further comprising:
switching-transistors coupled to switch the transformer in accordance with the switching signal;
wherein the switching signal includes phase shifts to achieve soft switching of switching-transistors, the phase shifts of the switching signal are generated in accordance with the synchronous signal.

21. The synchronous regulation circuit as claimed in claim 17, wherein the secondary-side switching circuit generates the synchronous signal and the pulse signal in response to a power-on signal, switching-transistors and the power switch are turned off once the power-on signal is disabled.

22. The synchronous regulation circuit as claimed in claim 17, wherein the primary-side switching circuit further generates an enable signal in response to the synchronous signal, the enable signal shows output load conditions of the power converter.

23. The synchronous regulation circuit as claimed in claim 17, wherein the power switch comprises a first transistor and a second transistor connected in series, the first transistor has a first diode connected in parallel, the second transistor has a second diode connected in parallel.

24. The synchronous regulation power converter as claimed in claim 23, wherein the control circuit generates a first-control signal and a second-control signal to control the first transistor and the second transistor respectively, the first transistor can be turned on once the first diode is conducted.

25. The synchronous regulation circuit as claimed in claim 17, further comprising:
a flyback switch coupled to the power switch;
wherein the flyback switch is turned on in response to the off of the power switch, the on time of the flyback switch is correlated to the on time of the power switch.

26. The synchronous regulation circuit as claimed in claim 17, wherein the secondary-side switching circuit comprises:
a programming device generating a program signal; and
a linear-predict circuit generating a drive signal in response to the program signal and the pulse signal;
wherein the drive signal is coupled to control a flyback switch.

27. The synchronous regulation circuit as claimed in claim 17, wherein the secondary-side switching circuit further comprises:
an oscillation circuit generating oscillation signals for generating the synchronous signal;
a PWM circuit generating a PWM signal in response to the oscillation signals;
an error amplifier coupled to the output of the power converter to receive the feedback signal and generate an error signal;
a ramp circuit generating a ramp signal in response to the PWM signal; and
a pulse signal generator generating the pulse signal in accordance with the PWM signal;
wherein the polarity of the synchronous signal determines the on/off of switching-transistors to switch the transformer, the PWM signal is enabled in response to the oscillation signals, the PWM signal is disabled in response to the oscillation signals and a clear signal, the clear signal is generated by the PWM circuit in response to the error signal and the ramp signal, the polarity of the pulse signal determines the on/off of the power switch.

28. The synchronous regulation circuit as claimed in claim 27, wherein the secondary-side switching circuit further comprises:
a soft-start circuit generating a soft-start signal in response to a reset signal;
wherein the soft-start signal is coupled to control the pulse width of the PWM signal.

29. The synchronous regulation circuit as claimed in claim 27, wherein the secondary-side switching circuit further comprises:
a power management circuit coupled to receive the error signal for generating a light-load signal;
wherein the light-load signal is coupled to on/off the switching signal during the light load of the power converter.

30. The synchronous regulation circuit as claimed in claim 17, wherein the control circuit comprises a latch circuit coupled to receive the pulse signal for set or reset the latch circuit, the latch circuit is coupled to turn on/off the power switch.

31. A method for providing synchronous regulation, comprising:
generating a synchronous signal and a pulse signal in response to a feedback signal and an oscillation signal;
transferring the synchronous signal through an isolation device;

generating a switching signal to switch a transformer in response to the synchronous signal;

transferring the pulse signal to a latch circuit;

setting or resetting the latch circuit in response to the polarity of the pulse signal; and turning on/off a power switch in accordance with the status of the latch circuit;

wherein the feedback signal is correlated to the output of the power converter, the power switch is coupled in between the transformer and the output of the power converter for the rectifying and the regulation.

32. The method as claimed in claim 31, further comprising:

receiving a program signal; and generating a drive signal to turn on/off a flyback switch in response to the program signal and the pulse signal;

wherein the flyback switch is coupled to the power switch and the output of the power converter.

33. The method as claimed in claim 31, further comprising:

generating an error signal in accordance with the feedback signal;

generating a light-load signal by comparing the error signal with a threshold signal;

wherein the light-load signal is coupled to turn off the switching signal and the power switch.

34. The method as claimed in claim 31, wherein a maximum on time of the power switch is limited by a maximum-on-time circuit.

* * * * *